United States Patent
Hessler et al.

(10) Patent No.: US 10,512,024 B2
(45) Date of Patent: Dec. 17, 2019

(54) APPARATUSES AND METHODS THEREIN FOR RELAYING DATA IN A WIRELESS COMMUNICATIONS NETWORK

(71) Applicant: Telefonaktiebolaget LM Ericsson (publ), Stockholm (SE)

(72) Inventors: Martin Hessler, Linköping (SE); Erik Eriksson, Linköping (SE); Pål Frenger, Linköping (SE); Jonas Fröberg Olsson, Ljungsbro (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 15/738,250

(22) PCT Filed: Jun. 26, 2015

(86) PCT No.: PCT/SE2015/050753
§ 371 (c)(1),
(2) Date: Dec. 20, 2017

(87) PCT Pub. No.: WO2016/209136
PCT Pub. Date: Dec. 29, 2016

(65) Prior Publication Data
US 2018/0184359 A1    Jun. 28, 2018

(51) Int. Cl.
*H04W 40/22* (2009.01)
*H04B 7/155* (2006.01)
(Continued)

(52) U.S. Cl.
CPC ............ *H04W 40/22* (2013.01); *H04B 7/155* (2013.01); *H04L 69/324* (2013.01); *H04L 5/0048* (2013.01); *H04W 72/1247* (2013.01); *H04W 84/047* (2013.01)

(58) Field of Classification Search
CPC combination set(s) only.
See application file for complete search history.

(56) References Cited

U.S. PATENT DOCUMENTS

| 8,351,846 B2 * | 1/2013 | Lee ..................... H04B 7/2606 370/331 |
| 2006/0171406 A1 * | 8/2006 | Kwon ................. H04L 12/4633 370/419 |

(Continued)

FOREIGN PATENT DOCUMENTS

| EP | 1 804 441 A1 | 7/2007 |
| EP | 1 921 807 A1 | 5/2008 |
| EP | 2 343 939 A1 | 7/2011 |

OTHER PUBLICATIONS

Supplementary European Search Report for European Patent Application No. 15896483.3 dated Jun. 4, 2018.
(Continued)

*Primary Examiner* — Hicham B Foud
(74) *Attorney, Agent, or Firm* — Sage Patent Group

(57) ABSTRACT

A method performed by a first wireless node for enabling relaying by a relaying wireless node of data intended for reception by a second wireless node. The first wireless node, second wireless node and relaying wireless node each operate in a wireless communications network. The first wireless node transmits a first payload data to the relaying wireless node. The first payload data comprises a second payload data intended for the second wireless node. The first payload data further comprises an indicator, which indicator indicates to the relaying wireless node how to relay the second payload data. The indicator comprises parameters related to radio transmission of the second payload data.

20 Claims, 21 Drawing Sheets

(51) Int. Cl.
*H04L 29/08* (2006.01)
*H04W 84/04* (2009.01)
*H04L 5/00* (2006.01)
*H04W 72/12* (2009.01)

(56) References Cited

U.S. PATENT DOCUMENTS

| | | | |
|---|---|---|---|
| 2007/0097945 A1* | 5/2007 | Wang | H04L 45/12 370/349 |
| 2008/0031182 A1* | 2/2008 | Maheshwari | H04B 7/155 370/320 |
| 2008/0219203 A1 | 9/2008 | Chou et al. | |
| 2008/0285501 A1 | 11/2008 | Zhang et al. | |
| 2009/0219854 A1* | 9/2009 | Okuda | H04B 7/155 370/315 |
| 2009/0303918 A1* | 12/2009 | Ma | H04B 7/2606 370/315 |
| 2010/0110972 A1* | 5/2010 | Kang | H04B 7/155 370/315 |
| 2010/0309858 A1* | 12/2010 | Chen | H04W 72/1289 370/329 |
| 2011/0128854 A1 | 6/2011 | Zhai | |

OTHER PUBLICATIONS

International Search Report for PCT International Application No. PCT/SE2015/050753 dated Mar. 23, 2016, 4 pp.
Written Opinion of the International Searching Authority for PCT International Application No. PCT/SE2015/050753 dated Mar. 23, 2016, 6 pp.

* cited by examiner

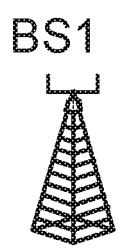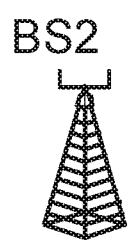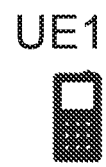
Fig. 1

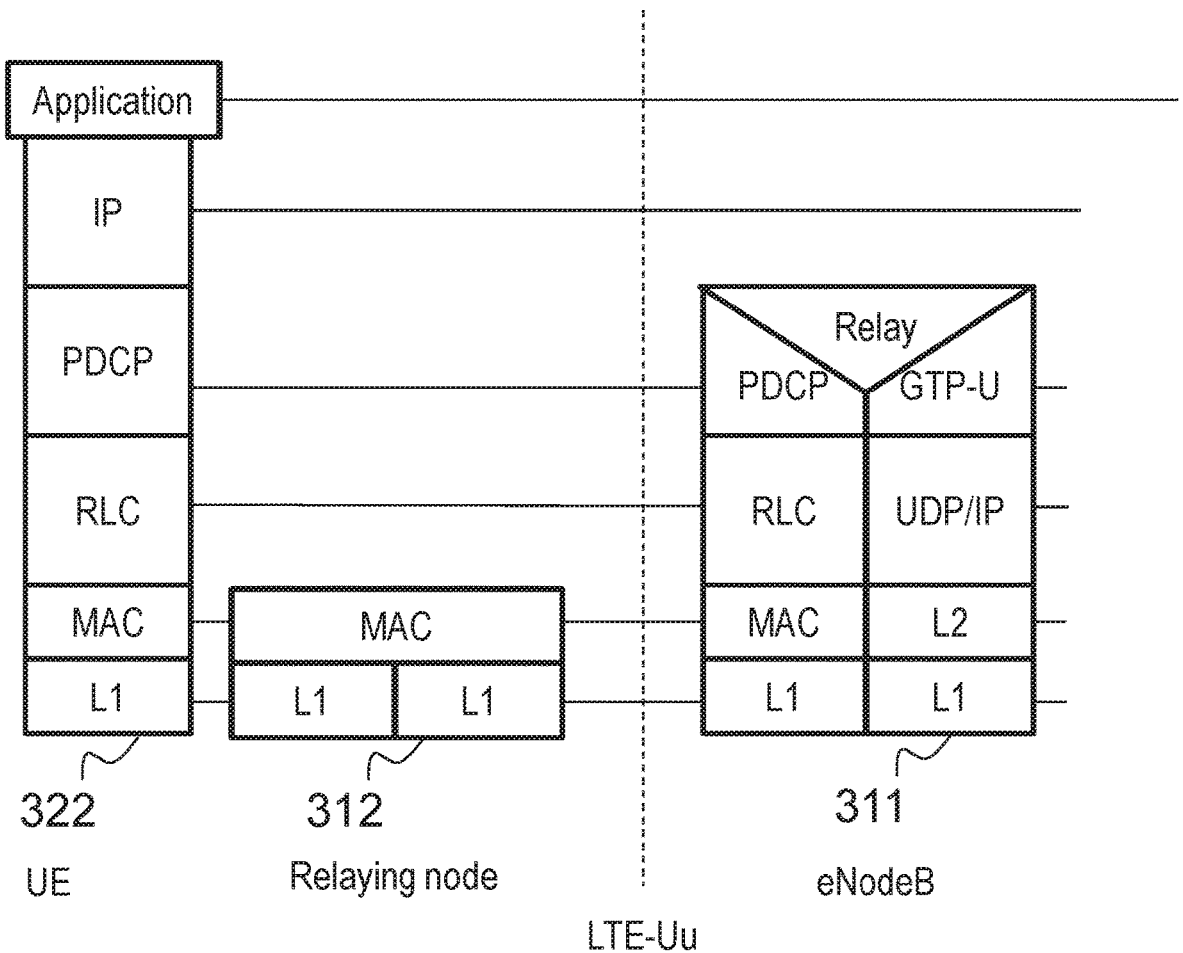
Fig. 5 L2 relaying node

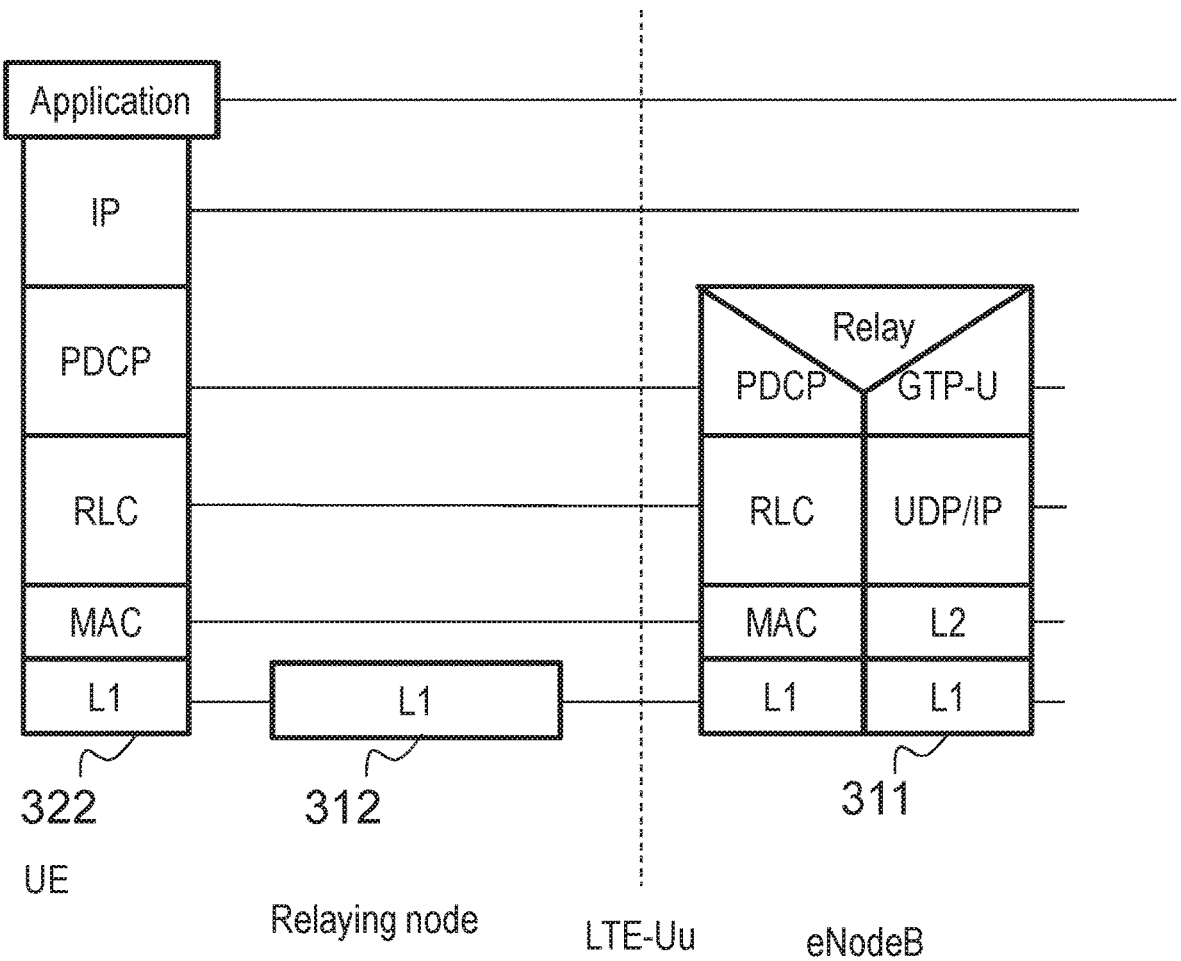
Fig. 6 L1 relaying node

Fig. 10 One hop relaying

Fig. 11 Two hop relaying

Fig. 12 Routing information

Fig. 13 Direct routing using stored route

Fig. 14 L1 relaying

Fig. 15 Soft-bit remapping

Fig. 16 Data pre-processing prior to data forwarding

Fig. 17 Message sending

APPARATUSES AND METHODS THEREIN FOR RELAYING DATA IN A WIRELESS COMMUNICATIONS NETWORK

CROSS REFERENCE TO RELATED APPLICATION

This application is a 35 U.S.C. § 371 national stage application of PCT International Application No. PCT/SE2015/050753, filed on Jun. 26, 2015, the disclosure and content of which is incorporated by reference herein in its entirety.

TECHNICAL FIELD

Embodiments herein relate to apparatuses and methods therein for relaying data in a wireless communications network.

BACKGROUND

Communication devices such as User Equipments (UE) are also known as e.g. Mobile Stations (MS), mobile terminals, and wireless terminals. UEs are enabled to communicate wirelessly in a wireless communications network or wireless communication system, sometimes also referred to as a cellular radio system or cellular networks. The communication may be performed e.g. between two UEs, between a mobile station and a regular telephone and/or between a mobile station and a server via a Radio Access Network (RAN) and possibly one or more core networks, comprised within the wireless communications network.

Examples of wireless communication systems are Long Term Evolution (LTE), Universal Mobile Telecommunications System (UMTS) and Global System for Mobile communications (GSM).

UEs may further be referred to as mobile telephones, cellular telephones, laptops, or tablets with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another mobile station or a server.

The wireless communications network covers a geographical area which is divided into cell areas, wherein each cell area being served by an access node such as a Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the UEs within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

Communication in Radio Networks

When communicating over a wireless link a wireless node needs information about the procedure for receiving data, and in the case of a scheduled Medium Access Control (MAC) protocol also how and when to transmit data. The procedure for receiving data may be governed by transmission parameters.

Most radio access technologies use scheduled radio access wherein two wireless nodes, such as a base station and a wireless communications device, may send payload data after first negotiating about transmission parameters. Generally, the radio access schemes using scheduled radio access aim to be resource efficient for receivers and to avoid collisions on radio resources.

LTE will be used here as an example. When a UE wants to have access to uplink spectrum in LTE in order to send for example payload data in uplink there is a periodic resource for scheduling requests from the UE.

A scheduling request from the UE is followed by an uplink grant sent from the base station to the UE. The uplink grant enables the UE to transmit the payload data in uplink.

FIG. 1 illustrates parts of a prior art wireless communications network, exemplified as an LTE network. In the prior art wireless communications network a first base station BS1 may communicate directly with one or more UEs as described above. For example, the first base station BS1 may communicate directly with a first user equipment UE1 or a second user equipment UE2. However, in some circumstances it may be beneficial for the first base station BS1 not to transmit data directly to the first user equipment UE1 or the second user equipment UE2, e.g., sometimes the first user equipment UE1 cannot be reached directly for some reason, due to e.g. the physical location of the first user equipment UE1. The first base station BS1 may as an alternative transmit the data intended for reception by the first user equipment UE1 to a second base station BS2, which may relay or forward the data to the first user equipment UE1. A similar relaying method is possible for transmitting data to the second user equipment UE2 via the second base station BS2, or via the first user equipment UE1. The above examples were given for DL communication. However, without going into details similar examples may be given for the UL. Networks making use of such relaying or forwarding as described above may be referred to as multi-hop networks.

Multi-Hop Networks

A multi-hop network is a wireless communications network adopting multi-hop wireless technology without deployment of wired backhaul links. Categories that may be used are for example: relay and mesh. The relay category may have a tree based topology, wherein one end of the path may be a base station.

The mesh category has a mesh topology, wherein multiple connections are possible among user equipments. Benefits of multi-hop technology may be:

Rapid deployment of the multi-hop network with lower-cost backhaul;
Easy to provide coverage in areas that are hard to wire;
Extended coverage due to multi-hop forwarding;
Enhanced throughput due to shorter hops; and
Extended battery life due to lower power transmission.

Relaying in multi-hop networks may for example be used when a UE cannot be reached directly and/or for inband self-backhauling. In inband self-backhauling a base station uses the same frequency band for the backhaul and for the radio access. This may for example be used when a base station does not have access to wired backhauling. In a hierarchical telecommunications network the backhaul portion of the network comprises the intermediate links between the core network and the small subnetworks at the "edge" of the entire hierarchical network. The small subnetworks at the "edge" is in the context of wireless communications networks the radio access network. Sometimes it may be cheaper both in terms of radio resource consumption and in cost to use inband self-backhauling. Inband self-backhauling has been identified to simplify deployments for 5th generation (5G) mobile networks.

Although scheduled radio access communication works well for a single link, there are several drawbacks when scheduled radio access communication is used in multi-hop relay networks. For example, it takes a lot of time and overhead resources to set up the links between the nodes in each link in a multi-hop relay chain.

In some scenarios prior art techniques does not work, for example, if the nodes in the multi-hop relay chain are unknown or if the protocols stacks in the nodes are not yet initiated.

SUMMARY

In some prior art solutions for relaying that make use of a multi-hop relay chain, each relaying node independently decodes and forwards a payload packet originating from the transmitting node according to some route or routing algorithm. In principle this means that each relaying node schedules the packet on the successive link according to a routing decision. In other words, each relay node independently decodes the payload packet received on one radio link and forwards the payload packet on the next link according to some predetermined route or routing algorithm. The routing decision may for example be configured in the nodes of the multi-hop relay chain, e.g. by a central node.

A problem with such prior art solutions for relaying is that a payload packet needs to be brought to a high communication protocol level, e.g. to Internet Protocol (IP) level. The relay node further needs prior knowledge about the radio link that corresponds to the next node or device with an IP-address or to a device with the IP-address in a routing table located in the relay node. The routing table may be obtained for example by setting up radio links to all available nodes and/or devices which is very costly and time consuming.

FIG. 2 illustrates a prior art solution for multi-hop radio networks using scheduled radio access. In this solution a transmitting node, such as a UE or an eNodeB, needs a radio link connection towards a receiving entity that it wants to schedule. In practice this means that relaying requires a radio bearer setup procedure via a relaying node. This involves a lot of control signaling before any payload data may be transmitted. FIG. 2 illustrates protocol levels of the user plane for a UE, a relaying node and an eNodeB in LTE. In FIG. 2 the following abbreviations are used: Internet Protocol (IP); Packet Data Convergence Protocol (PDCP); Radio Link Control (RLC); Medium Access Control (MAC); Layer 1 (L1); GPRS Tunneling Protocol (GTP-U); User Datagram Protocol (UDP); Layer 2 (L2).

In order for the relaying node to be able to relay any payload data, the network has to configure the relaying node with the protocols in FIG. 2, which involves a lot of signaling. Further, when the relaying node has been configured with the protocols a radio access bearer has to be set up by associating the PDCP instances in the UE and the eNodeB. For this other prior art solution to work the network needs to know which sequence of nodes to configure for relaying.

An object of embodiments herein is to improve the performance of a wireless communications network. The performance of the wireless communications network is improved by improving relaying of data, e.g. relaying of data in a multi-hop network.

According to a first aspect of embodiments herein, the object is achieved by a method performed by a first wireless node for enabling relaying by a relaying wireless node of data intended for reception by a second wireless node. The first wireless node, second wireless node and relaying wireless node each operate in a wireless communications network.

The first wireless node transmits a first payload data to the relaying wireless node. The first payload data comprises a second payload data intended for the second wireless node. The first payload data further comprises an indicator, which indicator indicates to the relaying wireless node how to relay the second payload data. The indicator comprises parameters related to radio transmission of the second payload data.

According to a second aspect of embodiments herein, the object is achieved by a method performed by a relaying wireless node for relaying data from a first wireless node and intended for reception by a second wireless node. The first wireless node, second wireless node and relaying wireless node each operate in a wireless communications network.

The relaying wireless node receives a first payload data from the first wireless node. The first payload data comprises a second payload data intended for the second wireless node. The first payload data further comprises an indicator, which indicator indicates to the relaying wireless node how to relay the second payload data. The indicator comprises parameters related to radio transmission of the second payload data.

The relaying wireless node further relays the second payload data based on the indicator.

According to a third aspect of embodiments herein, the object is achieved by a first wireless node configured to operate in a wireless communications network. The first wireless node is configured to perform the method according to the first aspect.

According to a fourth aspect of embodiments herein, the object is achieved by a relaying wireless node configured to operate in a wireless communications network. The relaying wireless node is configured to perform the method according to the second aspect.

The first payload data comprises the second payload data and the indicator which indicates to the relaying wireless node how to relay the second payload data. The indicator comprises parameters related to radio transmission of the second payload data.

Since the indicator indicates to the relaying wireless node how to relay the second payload data and comprises parameters related to radio transmission of the second payload data the relaying wireless node is able to perform relaying of the second payload data without being pre-configured for the relaying.

E.g. the relaying wireless node is able to relay the second payload data without prior knowledge of the second wireless node and/or the path to the second wireless node.

This improves the performance of the wireless communications network.

An advantage with embodiments herein is that they enable faster initial transmissions in a relay network.

BRIEF DESCRIPTION OF THE DRAWINGS

Examples of embodiments herein are described in more detail with reference to attached drawings in which:

FIG. 1 is a schematic block diagram illustrating a prior art wireless communications network.

FIG. 5 is a schematic block diagram illustrating an L2-relaying node.

FIG. 6 is a schematic block diagram illustrating an L1-relaying node.

DETAILED DESCRIPTION

Embodiments herein enable relay nodes to relay payload data without prior knowledge of the path to a target node and without setting up higher protocol level functionality. Further, embodiments herein improve the performance of a wireless communication network by improving relaying of data by a relaying wireless node.

Figure 2:
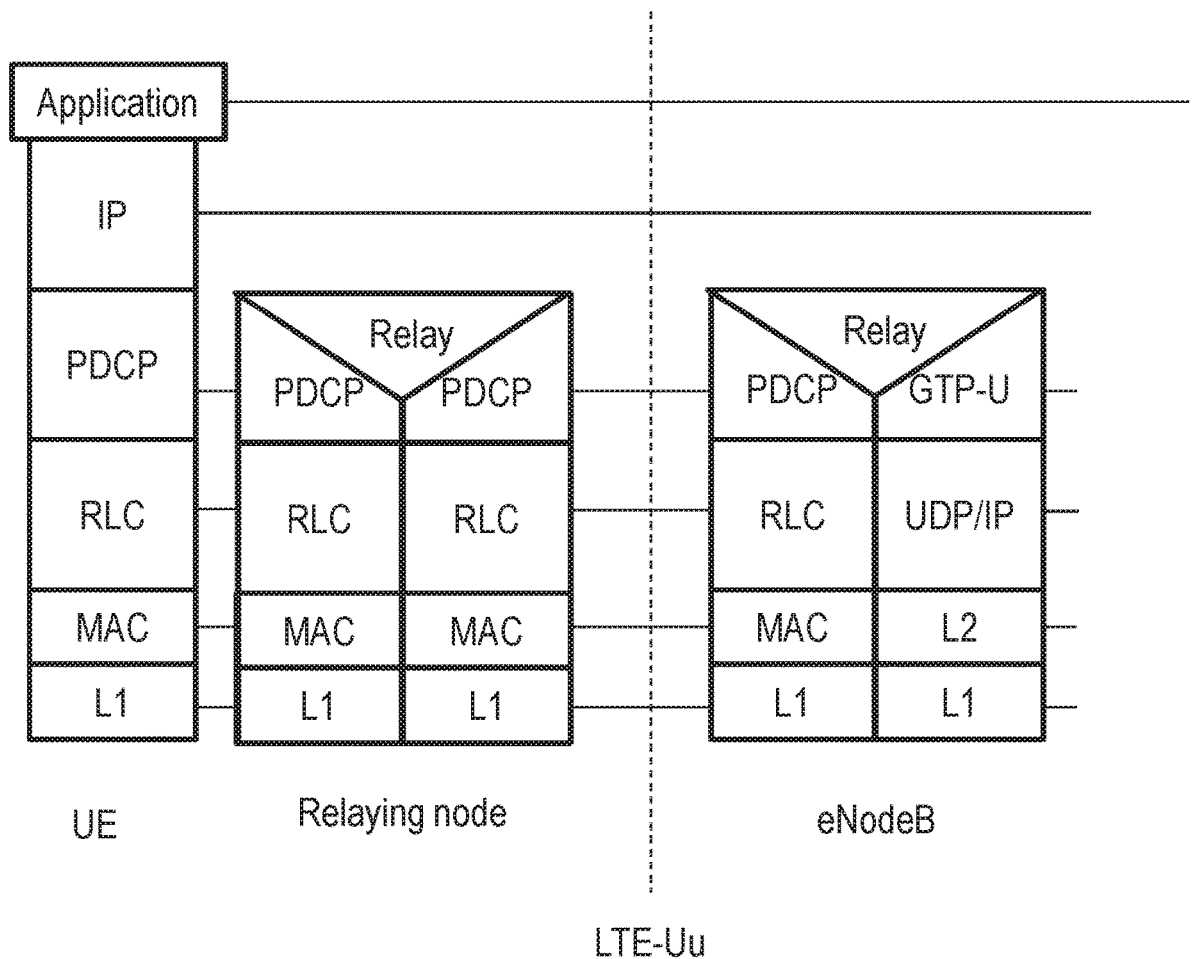
FIG. 2 is a schematic block diagram illustrating a prior art method of relaying in a wireless communications network.
Figure 3:
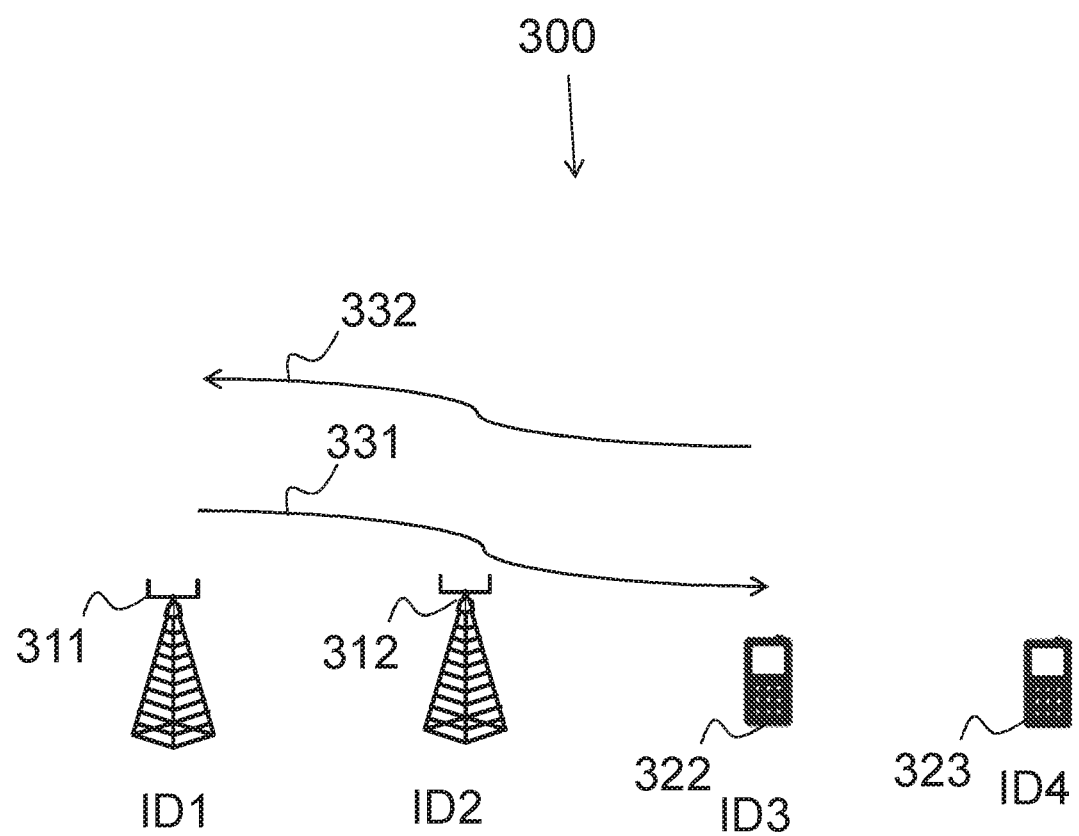
FIG. 3 is a schematic block diagram illustrating parts of a wireless communications network in which embodiments herein may be implemented.

FIG. 3 is a schematic block diagram depicting a wireless communications network 300 also known as a radio communications network, a telecommunications network or similar in which embodiments herein may be implemented. The wireless communications network 300 may comprise one or more Radio Access Networks (RAN) and one or more Core Networks (CN). The wireless communications network 300 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMAX), Bluetooth Low-Energy (BLE), Wi-Fi or Ultra Mobile Broadband (UMB), just to mention a few possible implementations. In embodiments herein the wireless communications network 300 will be exemplified with an LTE network.

Wireless nodes capable of communicating with other wireless nodes operate in the wireless communications network 300. For example, a first wireless node 311 may be a base station as depicted in FIG. 3. The first wireless node 311 may for example be capable of communicating with wireless communications devices, such as user equipment, other base stations and core network nodes, such as Mobility Management Entities (MME) that operate in the wireless communications network 300. The first wireless node 311 may also be referred to as a radio base station and e.g. a NodeB, an evolved Node B (eNB, eNode B), a base transceiver station, Access Point Base Station, base station router, or any other network unit capable of communicating with wireless communications devices.

A second wireless node 322 also operates in the wireless communications network 300. The second wireless node 322 is exemplified herein as a user equipment.

The second wireless node 322 may also be known as a mobile station, wireless device, wireless communications device and/or a wireless terminal. It should be understood by the person skilled in the art that "user equipment" is a non-limiting term which means for example any wireless communications device, wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station.

The first wireless node 311 wants to communicate with the second wireless node 322, which may also be referred to as a target wireless node. Due to some reason, for example in order to extend the coverage or due to in-band backhauling, the first wireless node 311 wants to communicate with the second wireless node 322 via a relaying wireless node 312. In embodiments herein the relaying wireless node 312 is exemplified with a base station.

In some embodiments the first wireless node 311 wants to communicate with a third wireless node 323 via for example the relaying wireless node 312 and the second wireless node 322. The third wireless node 323 is exemplified as a user equipment in embodiments herein. In those embodiments the second wireless node 322 may also be referred to as a second relaying wireless node 322.

In some embodiments a communication path from the first wireless node 311 to the second wireless node 322 via the relaying wireless node 312 is a multi-hop path 331 to the second wireless node 322. In some other embodiments a communication path from the second wireless node 322 to the first wireless node 311 via the relaying wireless node 312 is a multi-hop path 332 to the first wireless node 311. In these embodiments the first wireless node 311, the relaying wireless node 312 and the second wireless node 322 may be regarded as a multi-hop network, sometimes referred to as a relay network. Multi-hop paths to and from the third wireless node 323 are also possible and the third wireless node 323 may also be comprised in the multi-hop network mentioned above or in another multi-hop network comprising one or more of the wireless nodes mentioned above.

Other arrangements of the wireless nodes and other scenarios are of course possible, for example a scenario in which the third wireless node 323 wants to communicate with the relaying wireless node 312 via the second wireless node 322. Other scenarios may comprise further wireless nodes, not shown in FIG. 5, in the multi-hop network. However, embodiments targeting such other scenarios and arrangements would comprise the same or similar actions as described herein for the two scenarios described above.

It should be noted that the following embodiments are not mutually exclusive. Components from one embodiment may be tacitly assumed to be present in another embodiment and it will be obvious to a person skilled in the art how those components may be used in the other exemplary embodiments.

A method is disclosed herein for enabling relaying by the relaying wireless node 312 of data intended for reception by the second wireless node 322.

Embodiments herein enable the relaying wireless node 312 to perform relaying of the second payload data without being pre-configured for the relaying.

E.g. the relaying wireless node is able to relay the second payload data without prior knowledge of the second wireless node and/or the path to the second wireless node.

In some embodiments the indicator A1 may be implemented in L1 or L2/MAC. An advantage of these embodiments is that they enable intermediate wireless nodes, such as the relaying wireless node 312, of the multi-hop network to function without knowledge about functionalities of higher communication protocol levels in the wireless communications network 300, e.g. higher level functionalities in the multi-hop network.

This in turn reduces the time needed for sending data in the multi-hop network between wireless nodes at least two hops away.

Embodiments herein also save processing resources and reduce the overhead data that is needed to send payload data.

In embodiments herein the first wireless node 311 transmits the data intended for reception by the second wireless node 322 to the relaying wireless node 312 together with an indicator for the succeeding transmission from the relaying wireless node 312.

The indicator for the succeeding transmission is a control message that comprises radio transmission parameters that the relaying wireless node 312 uses in order to relay or forward the data in a radio transmission. The relaying wireless node 312 does not need to be pre-configured with information about the second wireless node 322 or the transmission path to the second wireless node 322. The indicator may e.g. be referred to as a data forward indicator or an indicator for relaying payload data. The indicator may be implemented as a lower layer indicator, i.e. layer 1 (PHY) or layer 2 (MAC) indicator. This enables the relaying wireless node 312 to relay the data without requiring any detailed knowledge about higher level protocols.

Figure 4:
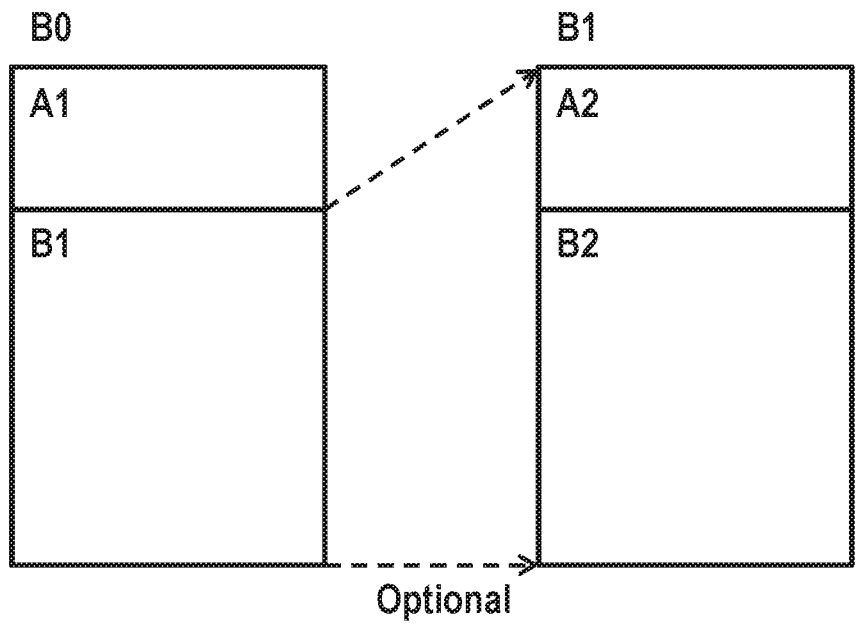
FIG. 4 is a schematic block diagram illustrating payload data according to embodiments herein.

FIG. 4 schematically illustrates some embodiments herein wherein the indicator is embedded in the payload data.

FIG. 4 illustrates how a first payload data B0 transmitted to the relaying wireless node 312 may comprise a second payload data B1 intended for reception by the second wireless node 322 and an indicator A1 for the succeeding transmission. As mentioned above the multi-hop network may comprise more than two hops. Embodiments herein may then be used to reach wireless target nodes that are more than two hops away. Such a wireless target node is e.g. the third wireless node 323 in FIG. 3. Therefore, the second payload data B1 may comprise a third payload data B2 intended for the third wireless node 323, and a second indicator A2 which indicates to the second wireless node 322 how to relay the third payload data B2. The second indicator A2 comprises parameters related to radio transmission of the third payload data B2.

In some embodiments the relaying wireless node 312 is an L2 relaying node that performs L2 relaying. FIG. 5 illustrates an L2 relaying node in a multi-hop network comprising the first wireless node 311, such as an eNodeB, the L2 relaying wireless node 312 and the second wireless node 322, such as a UE. Then the indicator A1 may be comprised in a MAC element. Said indicator may further be implemented with one or more embedded MAC headers in a data transmission. The MAC header may point to the indicator and describe what information that is comprised in the indicator.

In some other embodiments the relaying wireless node 312 is an L1 relaying node that performs L1 forwarding. FIG. 6 illustrates an L1 relaying node in a multi-hop network comprising the first wireless node 311, such as an eNodeB, the L2 relaying wireless node 312 and the second wireless node 322, such as a UE. Then the indicator may be encoded separately from payload data intended for reception by the second wireless node 322.

The indicator A1 may comprise a transmission format for the second payload data B1, which helps the relaying wireless node 312 to transmit the second payload data B1.

The indicator A1 may further comprise a radio resource allocation to use for relaying the second payload data B1.

The indicator A1 may also comprise a processing and transmitting method of the second payload data B1, which helps the relaying wireless node 312 to optimize the transmission of the second payload data B1.

Further, the indicator A1 may comprise Demodulation reference signal assignments. The Demodulation reference signal assignments are used by the relaying wireless node 312 to enable the second wireless node 322 to decode the second payload data.

In some embodiments the indicator A1 comprises a number of layers to use when transmitting the second payload data B1. The layers are related to Multiple Input Multiple Output (MIMO).

In some embodiments the indicator A1 comprises instructions relating to how to derive pre-coding for transmission of the second payload data B1.

In some further embodiments the indicator A1 comprises prioritization information for scheduling of the second payload data B1. This helps the relaying wireless node 312 to prioritize among several second payload data B1.

In some embodiments the indicator A1 comprises one or more identities ID1, ID2, ID3, ID4 of wireless nodes 311, 312, 322, 323. The identities may be used as routing information in the multi-hop network. E.g. so that the relaying wireless node 312 is able to relay the second payload data in a dedicated transmission instead of a broadcast or multicast transmission.

The processing and transmitting method of the second payload data B1 may comprise any one or more out of: decoding encoded second payload data B1 and L2-forwarding; and L1-forwarding. L1-forwarding may comprise L1-relaying and/or soft-bit remapping as described in more detail below.

Figure 7A:
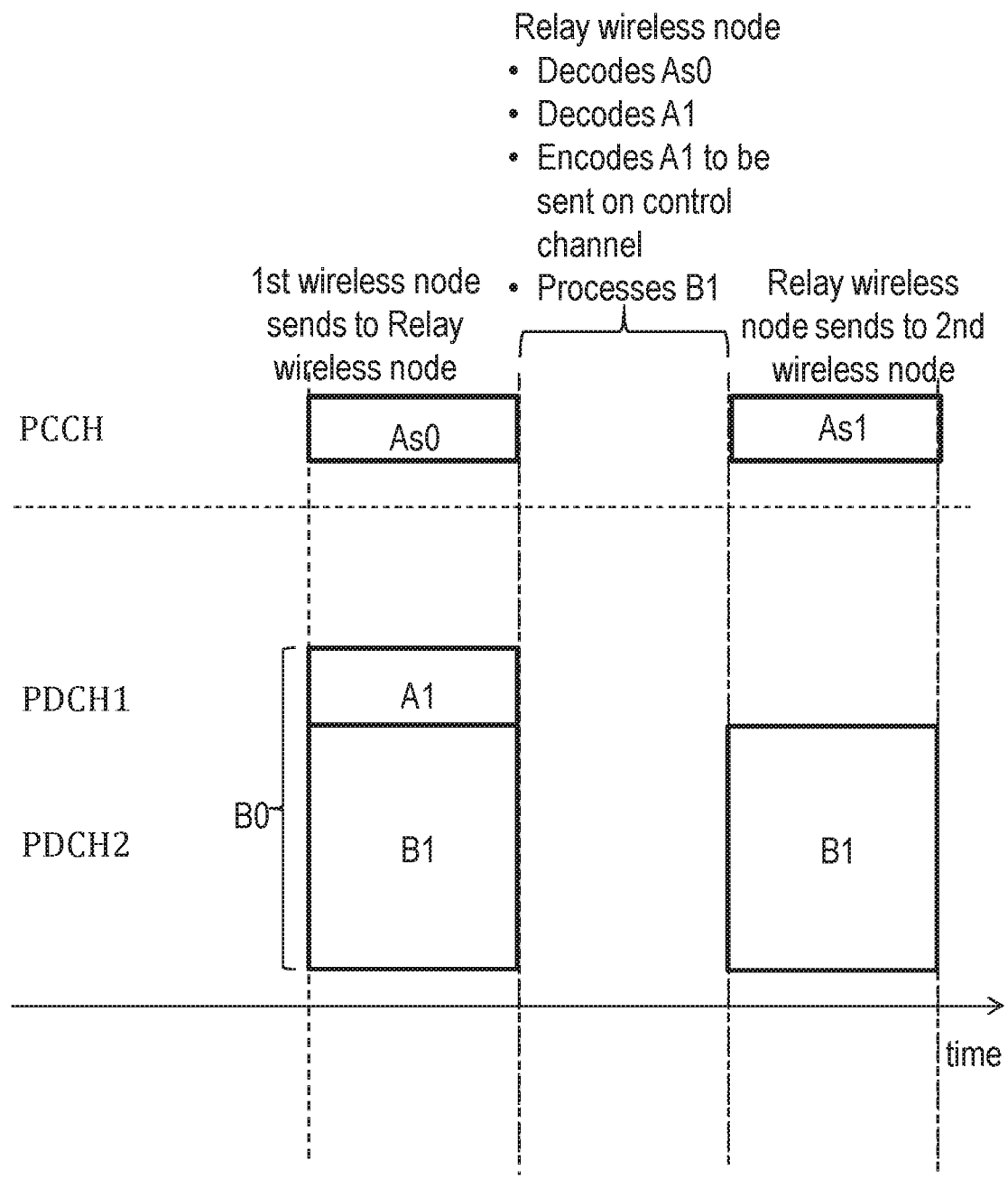
FIG. 7a is a schematic block diagram illustrating embodiments of a method performed in a wireless communications network.
Figure 7B:
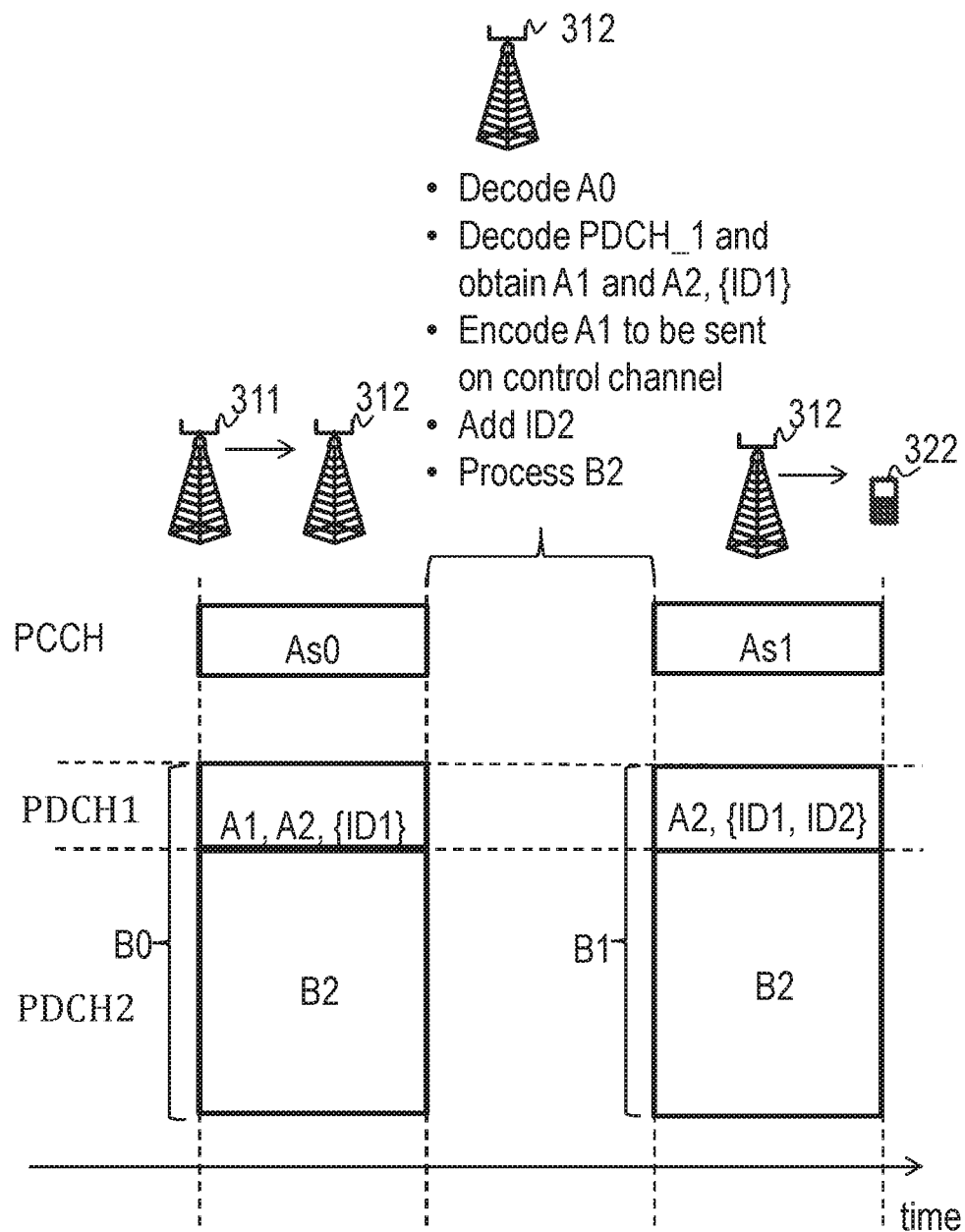
FIG. 7b is a schematic block diagram illustrating embodiments of a method performed in a wireless communications network.

FIG. 7a and FIG. 7b illustrate two possible embodiments which will serve to get a general understanding of embodiments herein and to get an overview of actions that take place in the different nodes.

FIG. 7a illustrate a first embodiment wherein the processing and transmitting method of the second payload data B1 comprises L1-relaying and L1-processing, such as soft-bit remapping. The first wireless node 311 transmits a first assignment As0 on a control channel, such as a Physical Control Channel (PCCH), to the relaying wireless node 312. The assignment As0 relates to the first payload data B0 which is to be transmitted to the relaying wireless node 312. The relaying wireless node 312 may use the assignment As0 to decode the indicator A1. The first wireless node 311 further transmits the first payload data B0 to the relaying wireless node 312 on several data channels. E.g. the indicator A1 may be sent on a first data channel, such as a first Physical Data Channel (PDCH), PDCH1. The second payload data may be sent on a second data channel, such as a second PDCH, PDCH2. In case the second payload data B1 comprises the third payload data B2 and the second forwarding indicator A2, e.g. when there are more than two hops, the second payload data B1 may be sent on several channels, e.g. one data channel for the second indicator A2 and one data channel for the third payload data B2. This is not shown in FIG. 7a.

The relaying wireless node 312 decodes the first assignment As0 and uses the decoded information from the first assignment As0 to decode the indicator A1. As mentioned above, the indicator A1 comprises instructions on how to process the second payload data B1, e.g. partial decoding for soft-bit remapping. The relaying wireless node 312 then processes the second payload data B1.

Then the relaying wireless node 312 constructs a second assignment As1 by encoding the indicator A1 to be transmitted on the PCCH and transmits the second assignment As1 on the PCCH to the second wireless node 322.

The second wireless node 322 decodes the second assignment As1 and uses the decoded information from the second assignment As1 to decode the second payload data B1 transmitted from the relaying wireless node 312.

In FIG. 7b the indicator A1 and the second indicator A2 are transmitted on the same data channel PDCH1, while the third payload data B2 is transmitted on the second data channel PDCH2.

FIG. 7b also illustrates one way of transmitting information related to routing in the multi-hop network. As mentioned above, such information may for example comprise identities of the wireless nodes. The first wireless node 311 may e.g. add its identity ID1 on the first data channel PDCH1. The relaying wireless node 312 decodes the first data channel PDCH1 and obtains the indicator A1, the second indicator A2 and the identity ID1 of the first wireless node 311. Then the relaying wireless node 312 encodes the second assignment As1 based on the indicator A1 and transmits the second assignment As1 on the control channel PCCH.

The relaying wireless node 312 further adds its identity ID2 to the data to be transmitted to the second wireless node 322, e.g. to the data sent on the first data channel PDCH1, such as the second indicator A2. The third payload data B2 is processed according to the instructions in the indicator A1.

Actions for enabling relaying by the relaying wireless node 312 of data intended for reception by the second wireless node 322 according to embodiments herein will now be described in more detail in relation to FIG. 7c, FIG. 8 and FIG. 9.

Figure 7C:
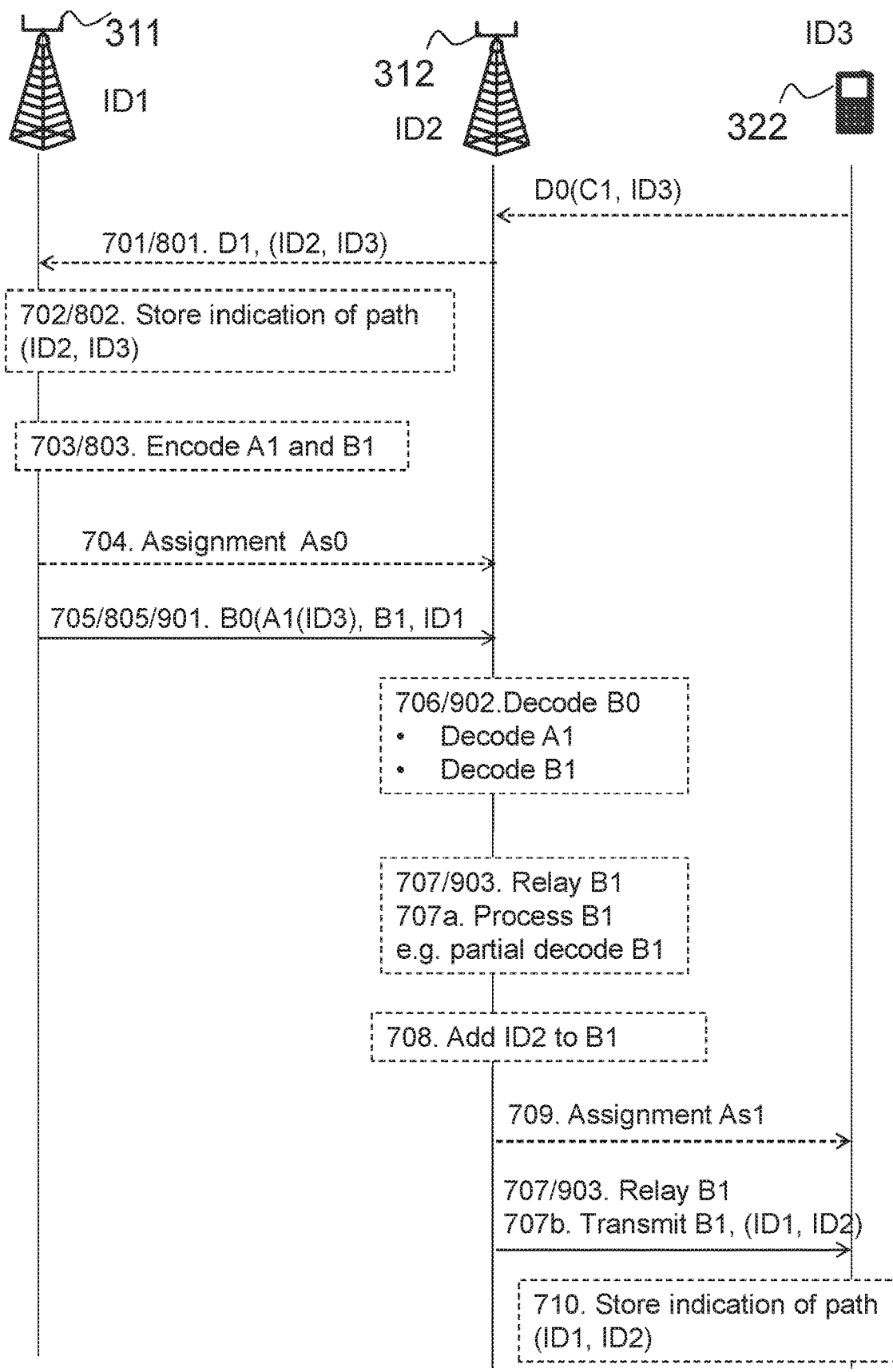
FIG. 7c is a combined signalling diagram and flow chart illustrating embodiments of a method performed in a wireless communications network.

FIG. 7c is a combined signalling diagram and flow chart that describes a method for enabling relaying by the relaying wireless node 312 of data intended for reception by the second wireless node 322 according to embodiments herein.

Figure 8:
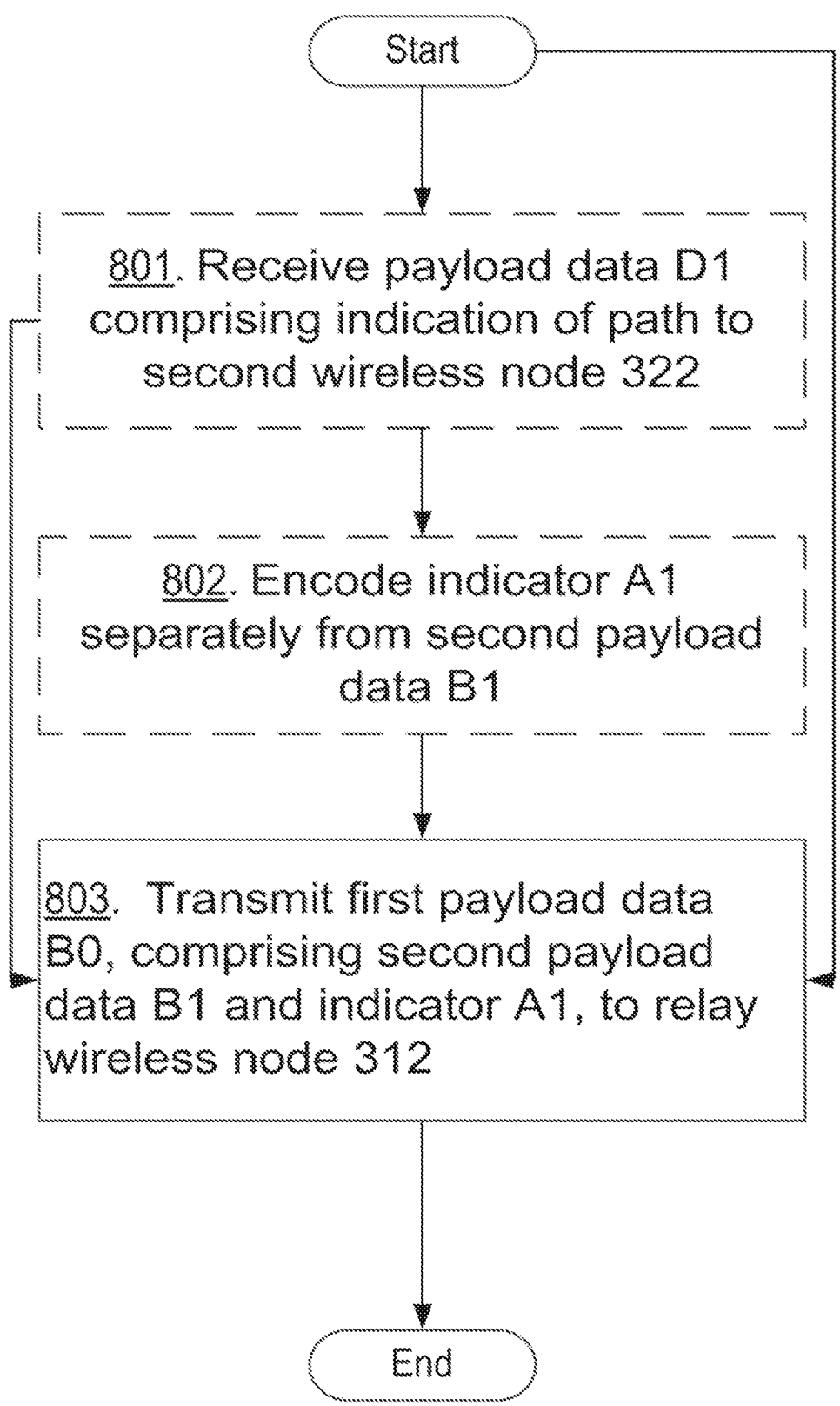
FIG. 8 is a flowchart illustrating embodiments of a method performed by a first wireless node.

FIG. 8 is a flowchart that describes a method performed by the first wireless node 311 for enabling relaying by the relaying wireless node 312 of data intended for reception by the second wireless node 322 according to embodiments herein.

Figure 9:
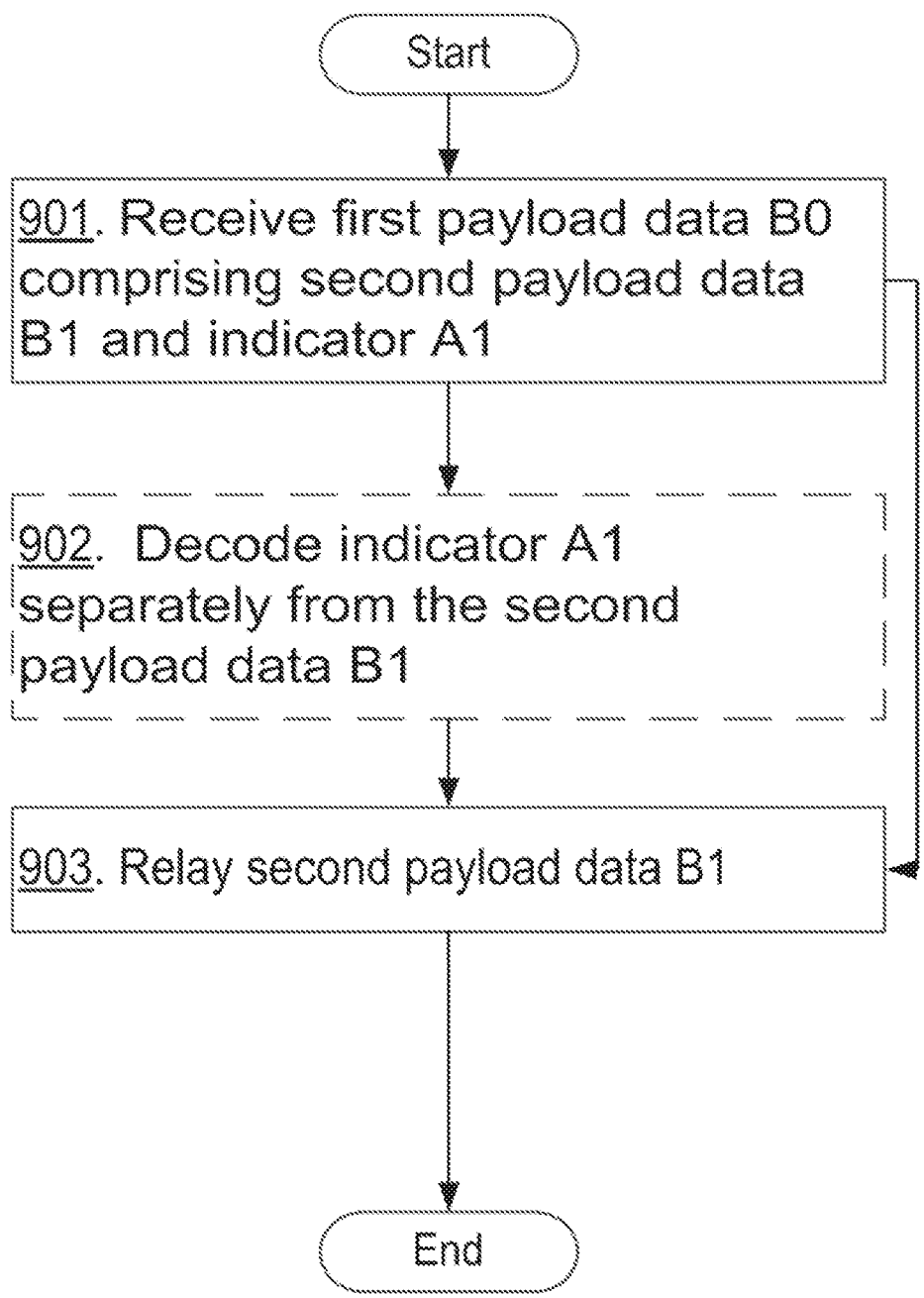
FIG. 9 is a flowchart illustrating embodiments of a method performed by a relaying wireless node.

FIG. 9 is a flowchart that describes a method performed by the relaying wireless node 312 for enabling relaying by the relaying wireless node 312 of data intended for reception by the second wireless node 322 according to embodiments herein.

Actions 701, 801

In some embodiments the first wireless node 311 receives a payload data D1 originating from the second wireless node 322 and comprising an indication of a multi-hop path 331 to the second wireless node 322. The indication may comprise identities of the wireless nodes in the multi-hop network, such as an identity ID2 of the relaying wireless node 312 and an identity ID3 of the second wireless node 322. The first wireless node 311 may use the indication of the multi-hop path 331 to route a future payload data through the multi-hop path 331 to the second wireless node 322.

An advantage with using the known multi-hop path 331 to the second wireless node 322 is that the first wireless node 311 and the relaying wireless node 312 may use dedicated transmissions instead of broadcast transmissions for transmitting the payload data intended for reception by the second wireless node 322. This reduces the used transmission resources in the wireless communications network. Further, having established a communication route, such as the multi-hop path 331, to the second wireless node 322 any method to improve the route to the second wireless node 322 may be utilized. For example, all stored routes or multi-hop paths to the second wireless node 322 may be compared and the route or multi-hop path with the best performance, e.g. with highest throughput and/or capacity, is chosen to transmit a future payload data to the second wireless node 322.

As seen in FIG. 7c the payload data D1 may have been transmitted from the second wireless node 322 to the relaying wireless node 312 for relaying to the first wireless node 311. As described above in relation to FIG. 4 the payload data D1 may have been comprised in another payload data D0 when transmitted from the second wireless node 322.

Actions 702, 802

When the first wireless node 311 has received the indication of the multi-hop path 331 the first wireless node 311 may store the indication of the multi-hop path 331 for future use.

Actions 703, 803

Before the first wireless node 311 transmits the first payload data B0 to the relaying wireless node 312 the first wireless node 311 may encode the first payload data B0.

When the relaying wireless node 312 is to use L1-forwarding the first wireless node 311 encodes the indicator A1 separately from the second payload data B1.

Separate channel coding for the indicator A1 and the second payload data B1 may be implemented to enable, for example, L1 relays and/or L1 network coding.

A more robust channel coding may be utilized for the indicator A1. An advantage with this is that it enables the relaying wireless node 312 to decode the indicator A1 even if it is not able to decode the second payload data B1.

In some embodiments the relaying wireless node 312 knows how to decode the second payload data B1 but may fail.

In some other embodiments the relaying wireless node 312 does not know anything about the decoding procedure for second payload data B1.

Separate channel coding of the indicator A1 and the second payload data B1 enables the relaying wireless node 312 to forward the second payload data B1 towards the target wireless node, such as the second wireless node 322, even if it cannot decode the second payload data B1. This may be used by network coding algorithms. E.g. some data is encoded over one route or multi-hop path, and some other data is encoded over a second route or multi-hop path, and only in the target wireless node, is there sufficient data to decode a message.

Another benefit of enabling intermediate relaying nodes to know how to decode the second payload data B1 is that the decoding process may improve the quality of the relayed data, even if the data is not decoded completely. This will be further explained below in action 705.

Action 704

In some embodiments the first network node 311 transmits an assignment As0, e.g. on a control channel such as PCCH, to the relaying wireless node 312. The assignment As0 relates to the first payload data B0 which is to be transmitted to the relaying wireless node 312. The relaying wireless node 312 may use the assignment As0 to decode the indicator A1 below in actions 706, 902.

Actions 705, 805, 901

As mentioned above the first wireless node 311 transmits the first payload data B0 to the relaying wireless node 312. The first payload data B0 comprises the second payload data B1 intended for the second wireless node 322 and the indicator A1. The indicator A1 indicates to the relaying wireless node 312 how to relay the second payload data B1, and comprises parameters related to radio transmission of the second payload data B1.

In some embodiments the target node is two hops away. An example of such an embodiment is illustrated in FIG. 10 where a broadcast or multicast transmission of payload data is implemented by embedding the indicator A1 to be used in a broadcast message BC0.

First the first wireless node 311 transmits 1001 the assignment As0, e.g. on a control channel such as PCCH to the relaying wireless node 312. Then the first wireless node 311 transmits 1002 a broadcast message BC0 comprising the first payload data B0. The first payload data B0 comprises the indicator A1.

Figure 10:
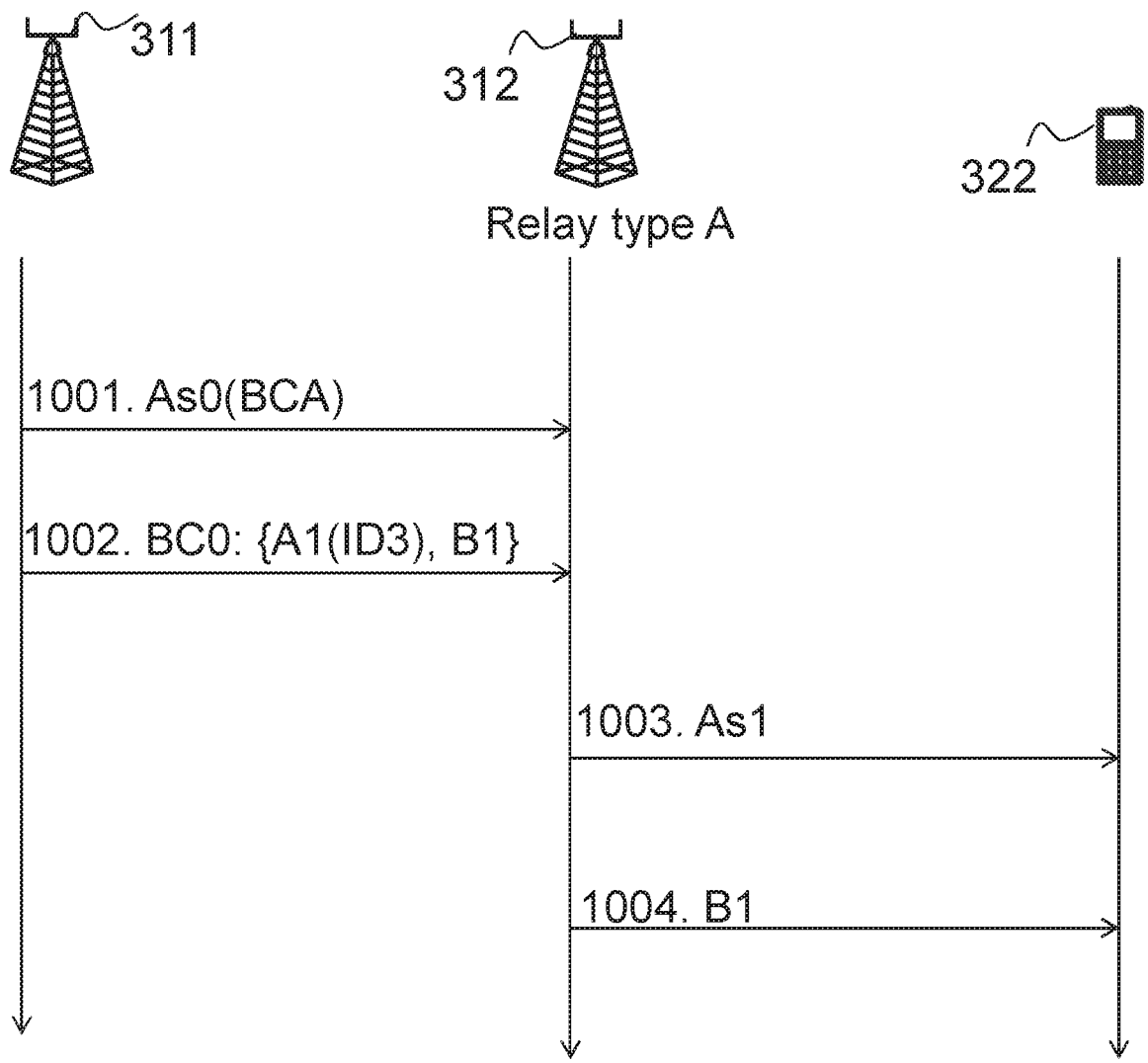
FIG. 10 is a signalling diagram illustrating further embodiments of a method performed in a wireless communications network.

The broadcast message may be intended for relaying wireless nodes of a specific type, such as type A in FIG. 10. This is indicated in FIG. 10 by having the assignment As0 for the broadcast message comprise transmission parameters BCA for transmitting to relaying wireless nodes of type A. By doing so the first wireless node 311 may reach the second wireless node 322 through any relaying wireless node of the specific type. In FIG. 10 type A comprises the relaying wireless node 312.

The indicator A1 comprises the identity ID3 of the second wireless node 322. The identity ID3 of the second wireless node 322 enables the relaying wireless node 312 to transmit 1003 an assignment As1, constructed based on the indicator A1 or parts thereof, to the second wireless node 322 with a dedicated transmission. Further, the identity ID3 of the second wireless node 322 enables the relaying wireless node 312 to relay the second payload data B1 in a dedicated transmission 1004 to the second wireless node 322.

Figure 11:
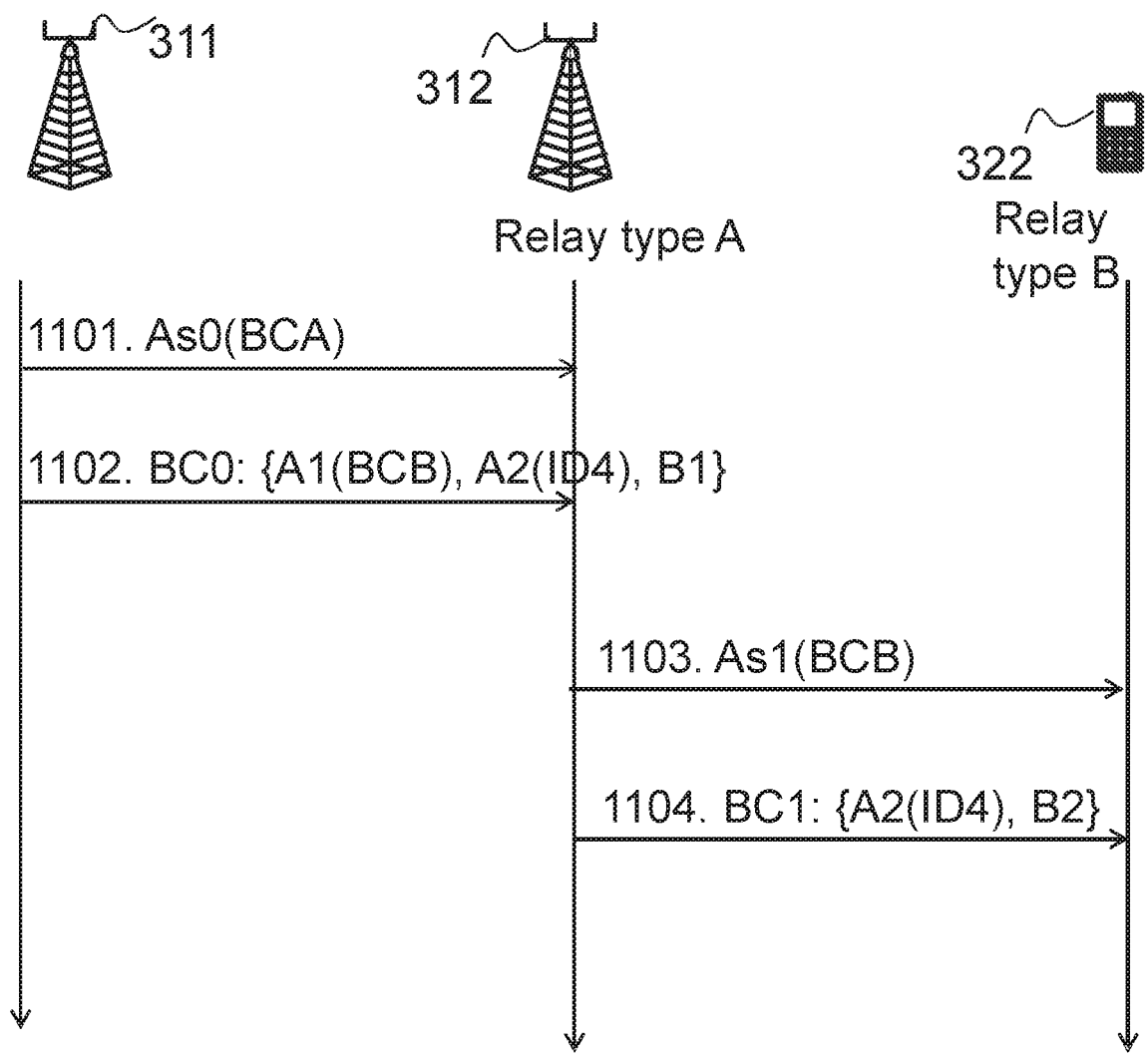
FIG. 11 is a signalling diagram illustrating further embodiments of a method performed in a wireless communications network.

As mentioned above the multi-hop network may comprise more than two hops. FIG. 11 illustrates an embodiment of two hop relaying. In FIG. 11 the first wireless node 311 embeds both the indicator A1 and the second indicator A2 in a broadcast message BC0 for wireless nodes of type A. The indicator A1 comprises transmission parameters for a second broadcast message BD1 for wireless nodes of type B. By doing so the first wireless node 311 may reach the third wireless node 323 through any relaying wireless node of type A and any relaying wireless node of type B in that order. In FIG. 11 type A comprises base stations and type B comprises user equipment.

Thus in FIG. 11 the first wireless node 311 transmits 1101 an assignment As0 to the relaying wireless node 312. Then the first wireless node 311 transmits 1102 the broadcast message BC0 and when the relaying wireless node 312 has received the broadcast message BC0 it transmits 1103 an assignment comprising the indicator A1 or parts thereof to relaying wireless nodes of type B, such as the second relaying wireless node 322. The relaying wireless node 312 further transmits 1104 the broadcast message BD1 to relaying wireless nodes of type B, such as the second relaying wireless node 322. Then the second relaying wireless node 322 may relay the payload intended for the third wireless node 323 in a dedicated transmission, for example using transmission parameters suitable for the identity ID4 of the third wireless node 323.

In some embodiments when the first wireless node 311 have received the indication of the multi-hop path 331, the first wireless node 311 transmits the first payload data B0 comprising the second payload data B1 intended for the second wireless node 322 to the relaying wireless node 312 and further through the multi-hop path 331 based on the received indication of the multi-hop path 331 to the second wireless node 322. In this case, the indicator A1 is based on the received indication.

A first example of how to use the indication of the multi-hop path 331 to the second wireless node 322 will now be given. The first wireless node 311 has received the indication of the multi-hop path 331. The indication comprises the identity ID2 of the relaying wireless node 312 and the identity ID3 of the second wireless node 322. Then the first wireless node 311 transmits the first payload data B0 to the relaying wireless node 312. The indicator A1 comprises the identity ID3 of the second wireless node 322. The relaying wireless node 312 then relays the second payload data B1 to the second wireless node 322.

Another example will be given here with two relaying nodes, e.g. the relaying wireless node 312 and the second relaying wireless node 322. The third wireless node 323 is in this case the target wireless node. The indicator A1 may then comprise the identity ID3 of the second wireless node 322, which is now the second relaying wireless node 322, and the identity ID4 of the third wireless node 323. Since the relaying wireless node 312 may be addressed directly from the first wireless node 311 the identity ID2 of the relaying wireless node 312 does not need to be comprised in the indicator A1. When the relaying wireless node 312 receives the indicator A1 with the identities ID3 and ID4, and the second payload data B1, it may remove its own identity ID2 from the indicator A1. Then the relaying wireless node 312 transmits the second indicator A2 comprising the identity ID4 of the third wireless node 323 to the second wireless node 322, and also forwards the third payload data B2. The second wireless node 322 then forwards the third payload data B2 to the third wireless node 323.

Figure 12:
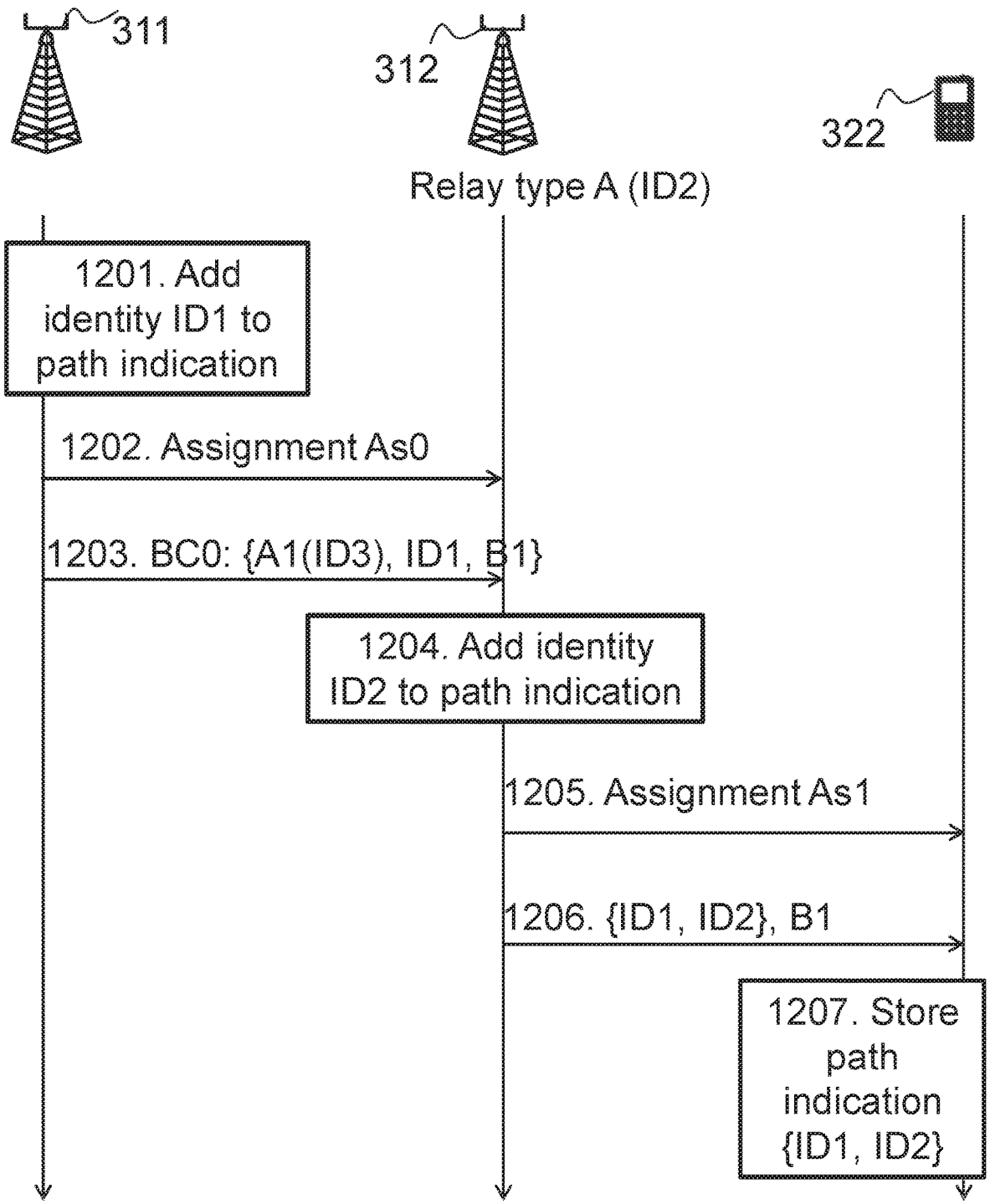
FIG. 12 is a combined signalling diagram and flow chart illustrating further embodiments of a method performed in a wireless communications network.

In some embodiments the first wireless node 311 also adds or appends its own identity ID1 to the first payload data B0. FIG. 12 illustrates how routing information, such as identities of the wireless nodes, may be added or appended to the payload data. The identity ID1 of the first wireless node 311 may be comprised either in the indicator A1 or in the second payload data B1. The routing information may be used by the target wireless node, such as the second wireless node 322, in order to make transmissions over the multi-hop network in the reverse direction. The second wireless node 322 may first store the routing information.

In some embodiments the indicator A1 comprises identities of wireless nodes for all hops. In some other embodiments the identities of the wireless nodes being "not-next-hop" is part of the second payload data B1.

When the indicator A1 comprises identities of wireless nodes for all hops, it may be preferred that the identity of a specific relaying wireless node is removed from subsequent indicators in the specific relaying wireless node.

Figure 13:
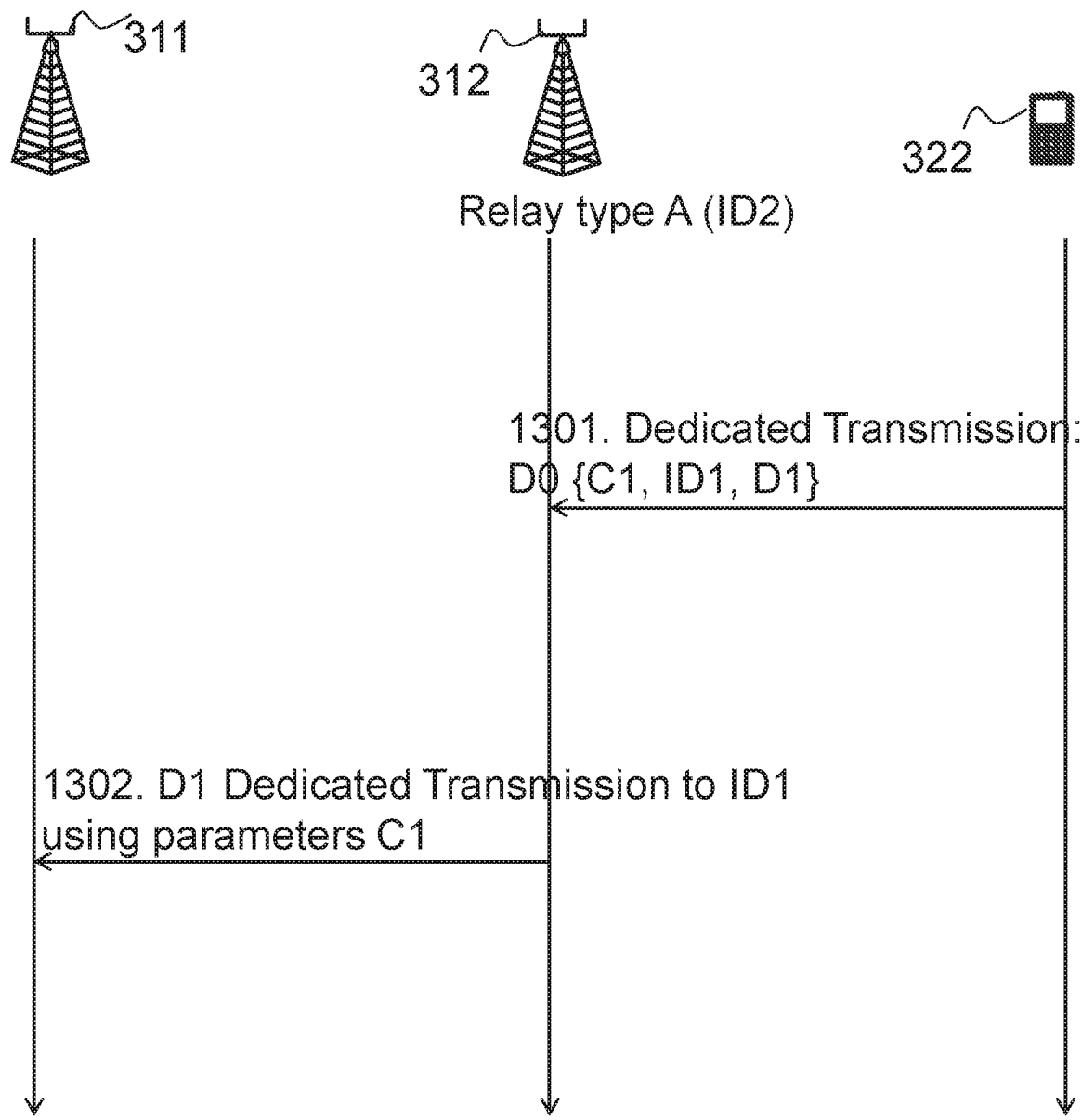
FIG. 13 is a signalling diagram illustrating further embodiments of a method performed in a wireless communications network.

However, in other embodiments it may be preferred that no identity is removed from the indicator. This may for example be the case when a receiver of payload data, such as the target wireless node, may use a multi-hop path in the reverse direction. This is illustrated in FIG. 13 and described in more detail below in action 708.

The relaying wireless node 312 receives the first payload data B0 from the first wireless node 311.

Consider for example LTE in which the physical parameters for the relaying of the 15 second payload data B1 are comprised in the indicator A1, e.g. implemented as either an UL-grant or a DL-assignment on Physical Downlink Control Channel (PDCCH) or Evolved PDCCH (EPDCCH). Hence when the relaying wireless node 312 implementing embodiments herein receives the first payload data B0 it will transmit the relevant parts of the indicator A1 on PDCCH/EPDCCH if it is logically an eNodeB. If the relaying wireless node 312 is a user equipment, it will read the indicator A1, e.g. if the indicator A1 includes an UL-grant. Such an UL-grant may be of a new type or a standard UL-grant with an extension.

Actions 706, 902

As mentioned above in relation to actions 703/803 the relaying wireless node 312 may decode the indicator A1, e.g. in order to be able to read a content of it. For embodiments wherein the second payload data B1 and the indicator A1 are encoded separately, the relaying wireless node 312 may decode the indicator A1 separately from the second payload data B1.

In other words, when the relaying wireless node 312 is to use L1-forwarding and the first wireless node 311 has encoded the indicator A1 separately from the second payload data B1, then the relaying wireless node 312 decodes the indicator A1 separately from the second payload data B1.

Actions 707, 903

The relaying wireless node 312 relays the second payload data B1 based on the indicator A1 comprised in the first payload data B0. As mentioned above the first payload data B0 comprises the second payload data B1 intended for the second wireless node 322 and the indicator A1. The indicator A1 indicates to the relaying wireless node 312 how to relay the second payload data B1, and comprises parameters related to radio transmission of the second payload data B1.

Since the indicator A1 comprises instructions to the relaying wireless node 312 how to relay the second payload data B1 the relaying wireless node 312 is able to relay the second payload data B1 without prior knowledge of a path to the second wireless node 322. This improves the performance of the wireless communications network 300. E.g. it enables faster initial transmissions in the wireless communications network 300.

Further, in some embodiments wherein the indicator A1 is comprised in the first payload data B0 and is implemented in L1 and/or L2 the relaying wireless node 312 is able to relay the second payload data B1 without knowledge of higher protocol level functionality. This reduces overhead associated with setting up a traditional protocol chain for a multi-hop network. This also enables the wireless nodes, such as the first wireless node 311, the relaying wireless node 312 and the second wireless node 322, operating in the wireless communications network 300 to use new techniques such as L1 network coding.

As mentioned above the indicator A1 may comprise an indication of a multi-hop path to the second wireless node 322. E.g. the indicator A1 may comprises an indication of the multi-hop path 331 to the second wireless node 322. Then the relaying wireless node 312 may relay the second payload data B1 through the multi-hop path 331 to the second wireless node 322.

Action 707a

As mentioned above, in some embodiments the indicator A1 comprises the processing and transmitting method of the second payload data B1. The processing refers to pre-processing of the second payload data B1 before transmission on the next hop. Pre-processing may for example comprise any linear transformation of the second payload data B1, e.g. linear amplification as illustrated in FIG. 14.

Figure 14:
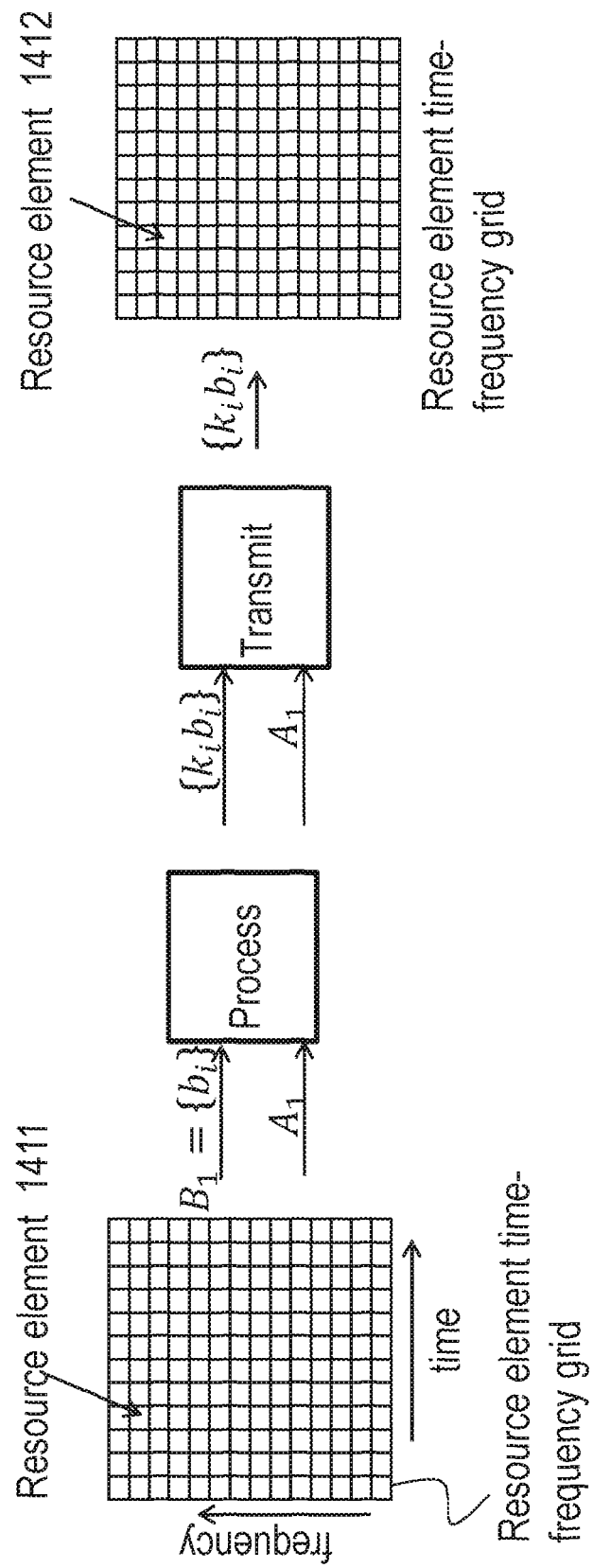
FIG. 14 is a schematic block diagram illustrating further embodiments of a method herein.

In FIG. 14 the received second payload data B1 comprises a set $\{b_i\}$ of received encoded data $b_i$. The set $\{b_i\}$ of received encoded data corresponds to a set of transmitted encoded data not shown. The set of transmitted encoded data has been transmitted from the first wireless node 311 on one or more resource elements 1411 for transmission. The resource elements 1411 are comprised in a resource element time-frequency grid schematically illustrated in FIG. 14. The relaying wireless node 312 then performs processing of the second payload data B1. In FIG. 14 the processing is exemplified by multiplying each encoded data $b_i$ with a constant $k_i$ in order to produce a scaled output $k_i b_i$. This scaled second payload data B1 is then transmitted according to the transmission parameters comprised in the indicator A1. The scaled second payload data B1 is transmitted by the relaying wireless node 312 on one or more second resource elements 1412 for transmission.

In some embodiments the one or more second resource elements 1412 used for relaying the scaled second payload data B1 are the same resource elements as the first wireless node 311 used for transmitting the second payload data B1 comprised in the first payload data B0.

However, in some other embodiments the one or more second resource elements 1412 used for relaying the scaled second payload data B1 are different resource elements compared to those used by the first wireless node 311 for transmitting the second payload data B1 comprised in the first payload data B0.

In some other embodiments the second payload data comprises the second indicator A2 and the third payload data B2. The second payload data B1 may then be partially decoded and partially processed. E.g. the second payload data B1 may comprise a first subset $\{b_{i1}\}$ of encoded data comprising the second indicator A2 and a second subset $\{b_{i2}\}$ of encoded data comprising the third payload data B2. Then the first subset $\{b_{i1}\}$ of encoded data may be decoded, while the second subset $\{b_{i2}\}$ of encoded data may be processed.

In other words, in some embodiments when the second payload data B1 and the indicator A1 are encoded separately, relaying comprises processing the encoded second payload data B1 and transmitting the encoded second payload data B1.

In some other embodiments when the second payload data B1 and the indicator A1 are encoded separately, relaying comprises processing part of the encoded second payload data B1 and transmitting part of the encoded second payload data B1.

Figure 15:
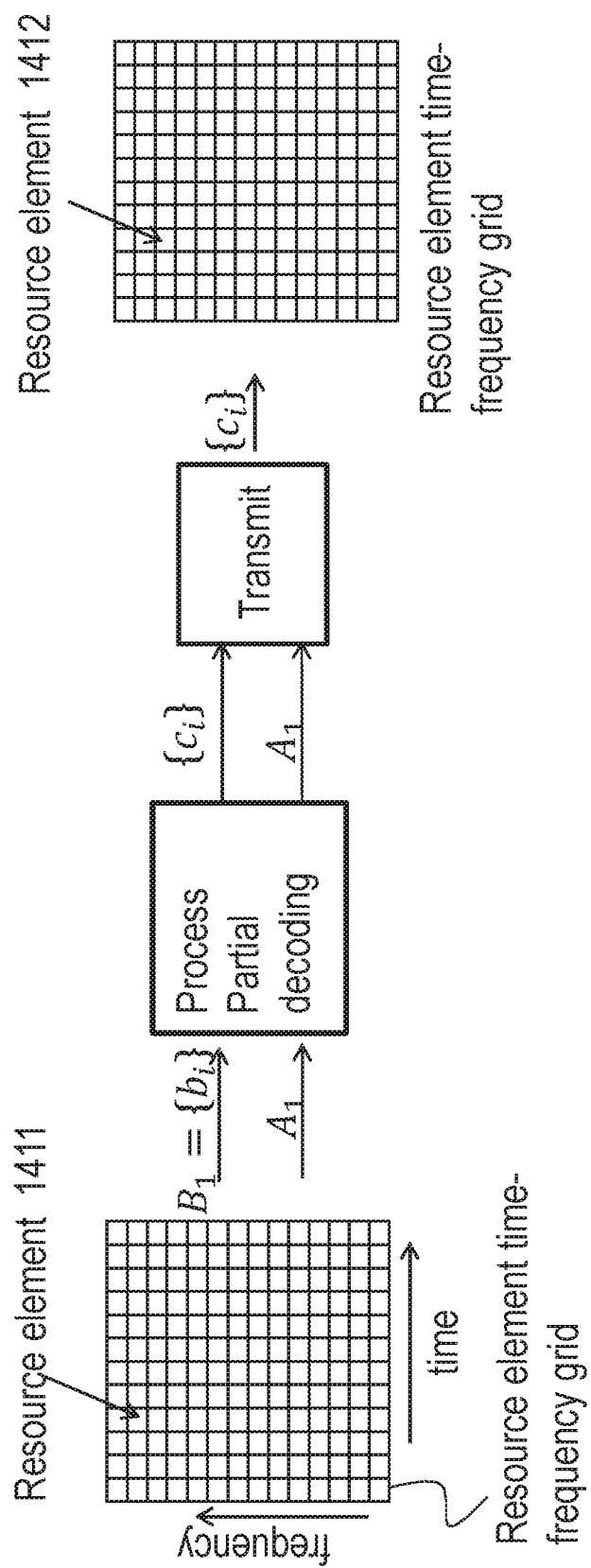
FIG. 15 is a schematic block diagram illustrating further embodiments of a method herein.

FIG. 15 illustrates another embodiment of relaying in which L1-forwarding is used. FIG. 15 illustrate how the relaying wireless node 312 may perform soft-bit remapping on the second payload data B1. By using soft-bit remapping the relaying wireless node 312 partially decodes the second payload data B1 which means that received symbols $\{b_i\}$ are processed to processed symbols $\{c_i\}$ before transmission to the second wireless node 322.

Thus, in some other embodiments when the second payload data B1 and the indicator A1 are encoded separately, relaying comprises processing decoded second payload data B1. After processing the decoded second payload data B1 the relaying wireless node 312 encodes the second payload data B1 for transmission. The relaying wireless node then transmits the processed second payload data 131. In other words, in these embodiments relaying comprises processing decoded second payload data B1 and transmitting processed second payload data B1.

As mentioned above in actions 703/803, separate channel coding for the indicator A1 and the second payload data B1 may be implemented to enable, for example, L1 relays and/or L1 network coding. As mentioned above, this may be used by network coding algorithms.

As also mentioned above, another benefit of enabling intermediate relaying nodes to know how to decode the second payload data B1 is that the decoding process may improve the quality of the relayed data, even if the data is not decoded completely. For example, by running a few turbo-decoding iterations on the second payload data B1 the relaying wireless node 312 may improve soft-bits related to the second payload data B1 before relaying the improved soft-bits on a forward link, i.e. towards the second wireless node 322. The soft-bits which are derived from a received signal carrying the second payload data B1 represent an uncertainty in an estimation of the second payload data B1 transmitted from the first wireless node 311. The estimation of the transmitted data may be performed in a decoding action in e.g. the relaying wireless node 312. Hence the transmission on the forward link may be done using the soft-bit information according to any state of the art technique for this type of transmissions. In general, pre-processing of the second payload data B1 is done according to information carried by the forwarding indicator A1. Such information may comprise the method for processing of the second payload data B1.

If a more robust channel coding is utilized for the indicator A1 than for the second payload data, the relaying wireless node 312 will be able to decode the indicator A1 even if it is not able to decode the second payload data B1.
Action 707b In some embodiments the relaying wireless node 312 transmits the second payload data B1 as received, based on the indicator A1, e.g. according to the instructions in the indicator A1. I.e. in these embodiments the relaying wireless node 312 transmits the second payload data B1 without processing the second payload data B1. In other words, in these embodiments relaying comprises transmitting the second payload data B1.

Figure 16:
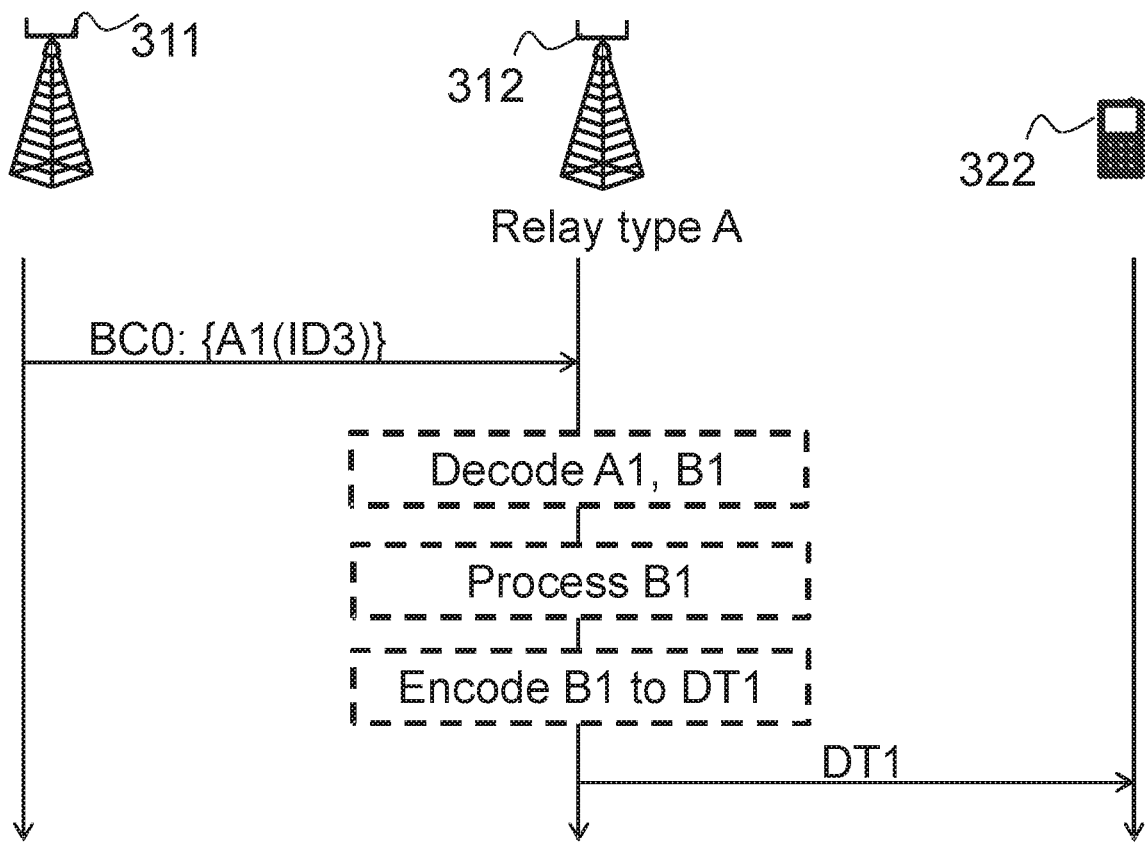
FIG. 16 is a combined signalling diagram and flow chart illustrating further embodiments of a method performed in a wireless communications network.

FIG. 16 illustrates that relaying may also comprise encoding the second payload data B1. In FIG. 16 the relaying wireless node 312 encodes the second payload data B1 to a dedicated transmission format DT1, which is different from the broadcast transmission format used by the first wireless node 311 to transmit the second payload data B1. A broadcasted message requires an encoding format that enables reception in all broadcasted relaying wireless nodes. A dedicated message is a message encoded differently compared with the broadcasted message and which is optimized for the receiver of the message. The first wireless node 311 may broadcast the first payload data B0 when it does not know how to reach the second wireless node 322. This has the advantage that the first wireless node 311 may transmit the first payload data B0 without first establishing a path to the second wireless node 322, which may be time consuming. When the relaying node 312 knows how to reach the second wireless node 322 it is more radio resource efficient to use a dedicated message, i.e. a dedicated transmission.
Actions 708, 904

As mentioned above, FIG. 12 illustrates how routing information, such as identities of the wireless nodes, may be added or appended to the payload data. The routing information may be used by the target wireless node, such as the second wireless node 322, in order to make transmissions over the multi-hop network in the reverse direction.

As illustrated in FIG. 12 the relaying wireless node 312 may add an indication of the multi-hop path 332 to the first wireless node 311 to the second payload data B1. Adding may be performed in several ways.

In some embodiments the relaying wireless node 312 unpacks a received MAC element comprising the indicator A1 and then constructs a new MAC element comprising the indication of the multi-hop path 332 to the first wireless node 311. The new MAC element may be transmitted on a data channel separate from the second payload data, e.g. PDCH1 as in FIG. 7b.

In some other embodiments adding may comprise appending a data field in the second payload data B1.

The indication of the multi-hop path 332 to the first wireless node 311 may comprise an identity ID2 of the relaying wireless node 312.
Action 709

The relaying wireless node 312 may transmit an assignment As1 with information on how to decode the second payload data B1.
Action 710

When the second wireless node 322 has received the indication of the multi-hop path 332 to the first wireless node 311, the second wireless node 322 may store the indication of the multi-hop path 332 to the first wireless node 311 for future use, e.g. for communicating with the first wireless node 311 using dedicated transmissions as illustrated in FIG. 13.

FIG. 12 will now be described in more detail. The first wireless node 311 adds 1201 its identity ID1 to the indication of the multi-hop path 332 to the first wireless node 311. The indication of the multi-hop path 332 is comprised in the first payload data B0, e.g. comprised in the indicator A1 or transmitted on the same channel as the indicator A1, e.g. on a first PDCH. The first wireless node 311 then transmits 1202 the assignment As0 as a broadcast message, which is received by the relaying wireless node 312. The first wireless node 311 further transmits 1203 the first payload data BC0 as a broadcast or multicast message intended for relaying nodes of type A. The indicator A1 comprised in the first payload data B0 may be sent on a first PDCH, while the second payload data B1 may be sent on a second PDCH.

The relaying wireless node 312 receives the first payload data B0. The relaying wireless node 312 then adds 1204 its identity ID2 to the multi-hop path 332 to the first wireless node 311. If the first wireless node 311 has not added its identity then the relaying wireless node 312 may also add the identity ID1 of the first wireless node 311. The relaying wireless node 312 transmits the second assignment As1 in a dedicated transmission to the second wireless node 322. The relaying wireless node 312 further transmits 1206 the second payload data B1 in a dedicated transmission to the second wireless node 322, e.g. on a PDCH. The relaying wireless node 312 also transmits the multi-hop path 332 to the first wireless node 311, e.g. on a PDCH. The second wireless node 322 stores the path to the first wireless node 311 by storing a combination of the identity ID1 of the first wireless node 311 and the identity ID2 of the relaying wireless node 312. The stored combination matches the order of the wireless nodes in the multi-hop path.

FIG. 13 illustrates how the second wireless node 322 may use the added routing information when transmitting a payload data D1 intended for the first wireless node 311 in the reverse direction. The assignment actions are not shown for simplicity. The second wireless node 322 transmits 1301 the payload data D1 intended for the first wireless node 311 in a dedicated transmission to the relaying wireless node 312 using transmission parameters suitable for the relaying wireless node 312 identified with its identity ID2. The relaying wireless node 312 then transmits 1302 the payload data D1 intended for the first wireless node 311 in a dedicated transmission to the first wireless node 311 using transmission parameters suitable for the first wireless node 311 identified with its identity ID1.

Further Details of Embodiments

In one embodiment it is desirable to send one message $M_i$ to a wireless node $D_i$ and a message $M_j$ to wireless node $D_j$. Node $D_i$ may only be reached via wireless node $D_j$. The first wireless node 311 constructs the i:th payload data $B_i=g_i(M_i)$ and the j:th payload data $B_j=g_j(M_j,f_j(A_i,g_i(M_i)))$. $g_j$ and $f_j$ are encoding functions. The inverse functions to $g_j$ and $f_j$ are known to node $D_j$ while the inverse of $g_i$ is known by node $D_i$. The first wireless node 311 transmits the first payload data $B_0=\{A_j,B_j\}$ to wireless node $D_j$ which extracts its message $M_j$ and $f_j(A_i,g_i(M_i))$ by its knowledge of the inverse function of $g_j$. Wireless node $D_j$ extracts $\{A_i,B_i=g_i(M_i)\}$ which it transmits to wireless node $D_i$ which in turn extracts its message $M_i$ from its knowledge of a decoding function of $g_i$.

Figure 17:
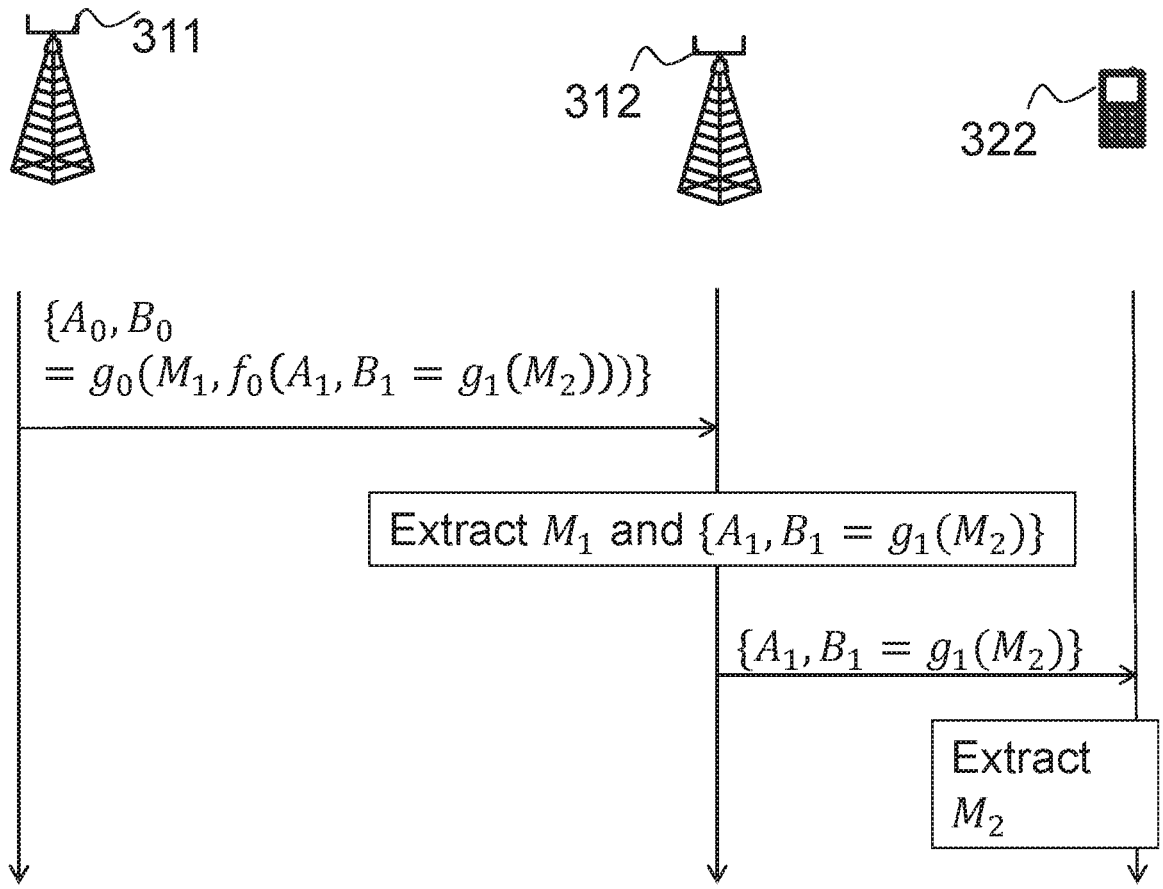
FIG. 17 is a combined signalling diagram and flow chart illustrating further embodiments of a method performed in a wireless communications network.

FIG. 17 illustrates a simplified version of this embodiment where i=2 and j=1 and wireless node $D_i$ is exemplified with the second wireless node 322 and wireless node $D_j$ is exemplified with the relaying wireless node 312. In an UL embodiment, referring to FIG. 17, M1 comprises an UL relaying grant for the relaying wireless node 312. M2 comprises an UL grant for the second wireless node 322. M1 may also comprise parameters for receiving an UL transmission from the second wireless node 322.

In some other embodiments the first wireless node 311 wants to transmit the message $M_i$ to the wireless node $D_i$. The wireless node $D_i$ cannot be directly reached, but via a set $S=\{D_{j_1}, \ldots, D_{j_J}\}$ of wireless nodes that each may reach $D_i$. The first wireless node 311 may then transmit a multi-cast message $\{A_j,B_j=f_j(A_i,g_i(M_i))\}$ to the set $S=\{D_{j_1}, \ldots, D_{j_J}\}$ of wireless nodes. The inverse function to $f_j$ is known to the devices in S while the inverse function to $g_i$ is known to $D_i$. The inverse function may for example be the decoding procedure to extract the data that should be forwarded according to the data forward procedure in the indicator. Upon reception of $\{A_j, B_j\}$ the wireless nodes in S extracts $\{A_i,B_i=g_i(M_i)\}$ which each one of them transmit to the wireless node $D_i$.

In other embodiments the wireless nodes in S are assigned modification functions $\varphi_{j_1}, \ldots, \varphi_{j_J}$ such that they instead of all transmitting $\{A_i,B_i\}$ the device $D_{j_m}$ transmit $\{\varphi_{j_m}(A_i),\varphi_{j_m}(B_i)\}$ for m=1, ..., J. The modification functions may also be referred to as processing functions. I.e. they are related to the processing of the payload data mentioned above.

An alternative way to describe embodiments herein is by scheduling a receiver, such as the relaying wireless node 312, to transmit from a specified data-queue. In LTE a UE, for example the relaying wireless node 312, receiving an uplink grant maps data from either higher layer buffers, such as MAC/RLC buffers, down to a HARQ buffer if the transmission is signaled as a new data transmission, or directly from the HARQ retransmission buffer if it is a retransmission. In embodiments herein one more data-sources may be added. Data may be mapped from the concurrent received transmission from the first wireless node 311. This data may for different embodiments be mapped into different layers in a decoder-chain.

In some embodiments the relaying wireless node 312 operates as an L1 relay, and the data is mapped directly to physical layer symbols as illustrated in FIG. 14. In more advanced embodiments the data may be demodulated and re-modulated, de-coded/re-coded or even mapped into HARQ buffers.

In some embodiments of the invention different nodes transmit the hierarchical header and the data the inner header grant is pointing to. One example of such a use-case is uplink relaying where the relaying wireless node 312 receives a reception order message, where the reception order refers to a data transmission from a UE, such as the second wireless node 322, lower in the relay chain. The reception order message also comprises a transmission order message where the relaying wireless node 312 is instructed to transmit the data just received.

Examples of the Payload Data $B_i$ and the Indicator $A_i$ and Related Procedures Examples of what may be included into the fields of a payload data $B_i$ and a indicator $A_i$, will be given now.

In some embodiments the indicator $A_i$ comprises an L2 indicator, a DeModulation Reference Signal (DMRS) assignment, a Cyclic Redundancy Check (CRC) information field, e.g. UE-identity, a receiver specific control channel search space and a Sounding Reference Signal (SRS) resource. After the relaying wireless node 312 has finished decoding the indicator $A_i$ the relaying wireless node 312 reads the content of the indicator $A_i$, places the decoded data in a transmit-buffer, e.g. a transmit buffer for L2 data forwarding. In some embodiments the relaying wireless node 312 also decodes the payload data $B_i$. The relaying wireless node 312 then measures on the SRS resource to make a link adaptation, makes a channel estimate and uses the channel estimate to make a link adaptation decision. Further, using the link adaptation decision and the DMRS and the CRC, the relaying wireless node 312 constructs a control message to be sent on a control channel within a search space for the receiver. The receiver will perform a number of decoding attempts for each of the candidates of the search space. The control channel may be a PCCH. Examples of PCCH are PDCCH and ePDCCH. The relaying wireless node 312 further constructs a DMRS-based data transmission granted on ePDCCH, for the assigned resources.

In some other embodiments the indicator $A_i$ comprises an L1 indicator, an indicator to use direct soft-bit remapping and a time-frequency resource for transmitting the remapped soft-bits. Direct soft-bit remapping means that a that the relaying wireless node 312 re-uses the same set of symbols of the same type for transmitting the second payload data B1 is as the first wireless node 311 used for the transmission of the second payload data B1 to the relaying wireless node 312. Then the relaying wireless node 312 stores the soft-bits, e.g. 4 soft-values per 16 Quadrature Amplitude Modulation (QAM) symbol, for the reception. The relaying wireless node 312 then remaps the soft-bits to the time-frequency resource and transmits on the assigned time-frequency resource. For example, the relaying wireless node 312 may receive data on resource blocks 0 . . . 9 using 16 QAM, i.e. 4 soft-values per resource element. The transmit resource may then be resource blocks 10 . . . 29 using QPSK. This means that each 4 soft-values from an 16QAM symbol are remapped to two QPSK symbols and hence the 10 resource blocks are transformed into 20 resource blocks in the transmission.

Figure 18:
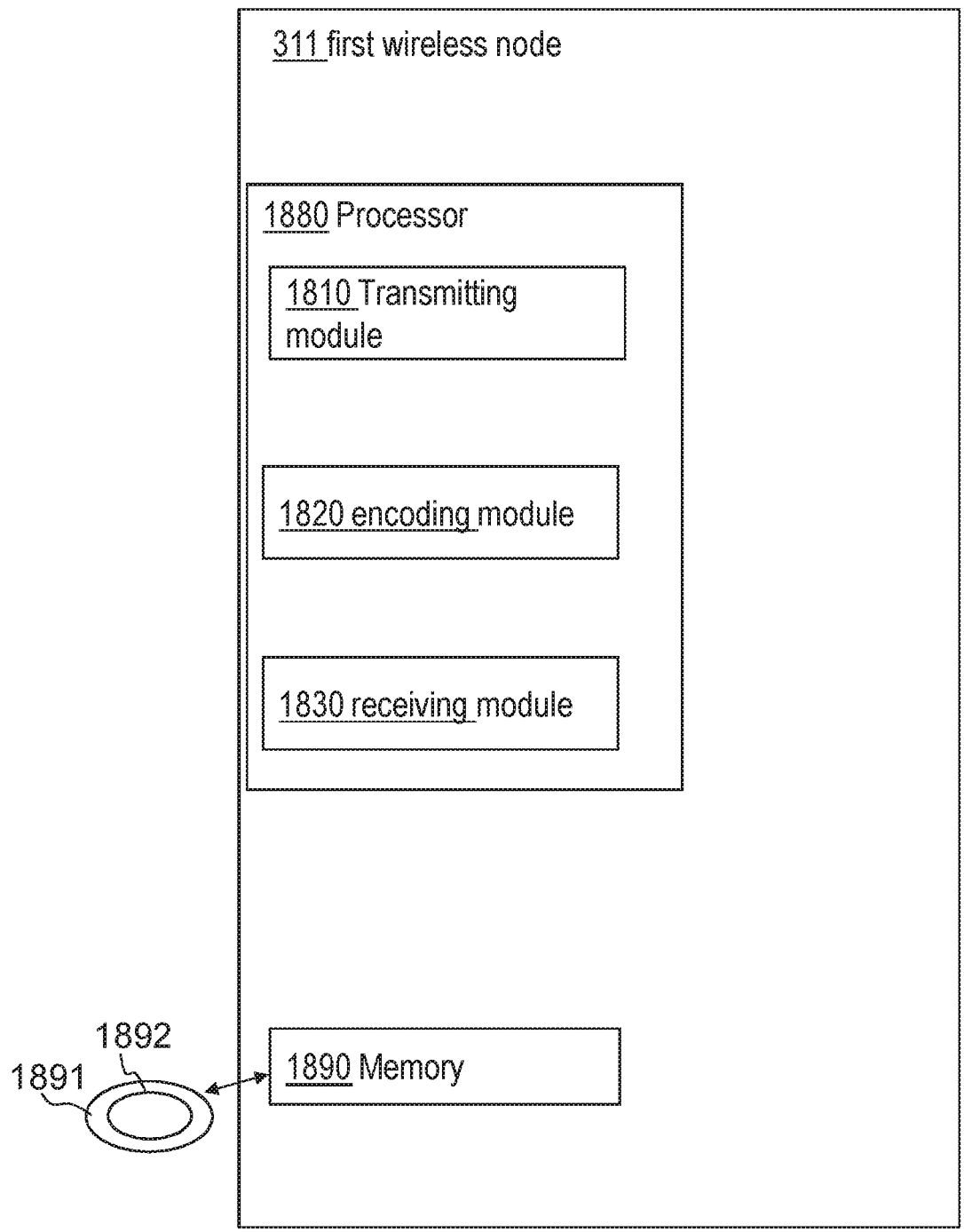
FIG. 18 is a schematic block diagram illustrating embodiments of a first wireless node.

To perform the method actions for enabling relaying by the relaying wireless node 312 of data intended for reception by the second wireless node 322 described above in relation to FIGS. 7c and 8, the first wireless node 311 comprises the following arrangement depicted in FIG. 18.

The first wireless node 311 is configured to operate in the wireless communications network 300.

The first wireless node 311 is configured to, e.g. by means of the transmitting module 1810 configured to, transmit the first payload data B0 to the relaying wireless node 312. The first payload data B0 comprises the second payload data B1 intended for the second wireless node 322 and the indicator A1. The indicator A1 indicates to the relaying wireless node 312 how to relay the second payload data B1, and comprises parameters related to radio transmission of the second payload data B1.

In some embodiments the indicator A1 is comprised in a MAC element.

As mentioned above, the indicator A1 may comprise any one or more out of:
a transmission format for the second payload data B1;
a radio resource allocation to use for relaying the second payload data B1;
a processing and transmitting method of the second payload data B1;
Demodulation reference signal assignments;
number of layers to use when transmitting the second payload data B1;
instructions relating to how to derive pre-coding for transmission of the second payload data B1;
prioritization information for scheduling of the second payload data B1; and
one or more identities ID1, ID2, ID3, ID4 of wireless nodes 311, 312, 322, 323.

As further mentioned above, the processing and transmitting method of the second payload data B1 comprises any one or more out of:
decoding encoded second payload data B1 and L2-forwarding; and L1-forwarding.

In some embodiments the second payload data B1 comprises the third payload data B2 intended for the third wireless node 323, and the second indicator A2. The second indicator A2 indicates to the second wireless node 322 how to relay the third payload data B2. The second indicator A2 comprises parameters related to radio transmission of the third payload data B2.

The first wireless node 311 may transmit the first payload data B0 comprising the second payload data B1 intended for the second wireless node 322 to the relaying wireless node 312 and further through the multi-hop path 331 based on the received indication of the multi-hop path 331 to the second wireless node 322. Then the indicator A1 is based on the received indication.

The transmitting module 1810 may be implemented by a transmitter or a processor 1880 in the first wireless node 311.

The first wireless node 311 is further configured to, e.g. by means of the encoding module 1820 configured to, encode the indicator A1 separately from the second payload data B1.

The encoding module 1820 may be implemented by the processor 1880 in the first wireless node 311.

The first wireless node 311 may further be configured to, e.g. by means of the receiving module 1830 configured to, receive a payload data D1 originating from the second wireless node 322 and comprising an indication of a multi-hop path 331 to the second wireless node 322.

The receiving module 1830 may be implemented by the processor 1880 in the network node 311, 115.

The embodiments herein for enabling relaying by the relaying wireless node 312 of data intended for reception by the second wireless node 322 may be implemented through one or more processors, such as the processor 1880 in the first wireless node 311 depicted in FIG. 18 together with computer program code for performing the functions and actions of the embodiments herein. The program code mentioned above may also be provided as a computer program product 1891 for instance in the form of a data carrier carrying computer program code 1892 for performing the embodiments herein when being loaded into the first wireless node 311. One such carrier may be in the form of a CD ROM disc. It is however feasible with other data carriers such as a memory stick. The computer program code may furthermore be provided as pure program code on a server and downloaded to.

Thus, the methods according to the embodiments described herein for the first wireless node 311 may be implemented by means of a computer program product, comprising instructions, i.e., software code portions, which, when executed on at least one processor, cause the at least one processor to carry out the actions described herein, as performed by the first wireless node 311. The computer program product may be stored on a computer-readable storage medium. The computer-readable storage medium, having stored there on the computer program, may comprise the instructions which, when executed on at least one processor, cause the at least one processor to carry out the actions described herein, as performed by the first wireless node 311. In some embodiments, the computer-readable storage medium may be a non-transitory computer-readable storage medium.

Those skilled in the art will also appreciate that the transmitting module 1810, the encoding module 1820 and the receiving module 1830 described above may refer to a combination of analogue and digital circuits, and/or one or more processors configured with software and/or firmware, e.g. stored in a memory 1890 that when executed by the one or more processors such as the processor 1880 perform as described above. One or more of these processors, as well as the other digital hardware, may be included in a single ASIC, or several processors and various digital hardware may be distributed among several separate components, whether individually packaged or assembled into a SoC.

The first wireless node 311 may further be configured to, e.g. by means of the memory 1890 configured to, store for example, the payloads, the indicators, such as MAC elements and/or MAC headers, indications of multi-hop paths, identities of relaying wireless nodes and configuration, transmission formats for the second payload data B1, radio resource allocations to use for relaying the second payload data B1, processing and transmitting methods of the second payload data B1, Demodulation reference signal assignments, number of layers to use when transmitting the second payload data B1, instructions relating to how to derive pre-coding for transmission of the second payload data B1, prioritization information for scheduling of the second payload data B1, schedulings and applications etc. to perform the methods herein when being executed in the first wireless node 311. The memory 1890 comprises one or more memory units.

Figure 19:
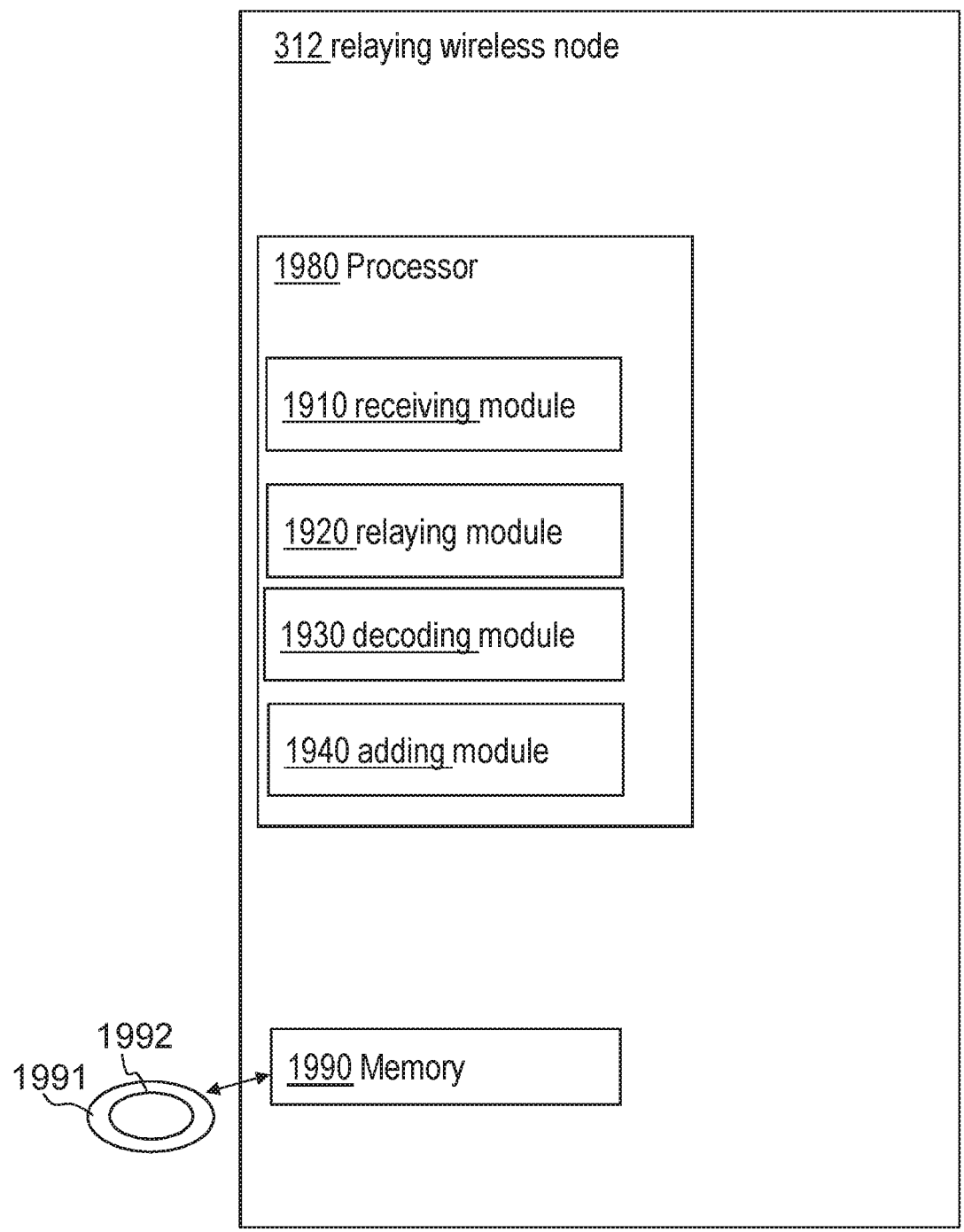
FIG. 19 is a schematic block diagram illustrating embodiments of a relaying wireless node.

To perform the method actions for relaying data from the first wireless node 311 and intended for reception by the second wireless node 322 described above in relation to FIGS. 7c and 9, the relaying wireless node 312 comprises the following arrangement depicted in FIG. 19.

The relaying wireless node 312 is configured to operate in the wireless communications network 300.

The relaying wireless node 312 is configured to, e.g. by means of the receiving module 1910 configured to, receive the first payload data B0 from the first wireless node 311. The first payload data B0 comprises the second payload data B1 intended for the second wireless node 322 and the indicator A1. The indicator A1 indicates to the relaying wireless node 312 how to relay the second payload data B1, and comprises parameters related to radio transmission of the second payload data B1.

In some embodiments the indicator A1 is comprised in a MAC element.

As mentioned above, the indicator A1 may comprise any one or more out of:
a transmission format for the second payload data B1;
a radio resource allocation to use for relaying the second payload data B1;
a processing and transmitting method of the second payload data B1;
Demodulation reference signal assignments;
number of layers to use when transmitting the second payload data B1;
instructions relating to how to derive pre-coding for transmission of the second payload data B1;
prioritization information for scheduling of the second payload data B1; and
one or more identities ID1, ID2, ID3, ID4 of wireless nodes 311, 312, 322, 323.

As further mentioned above, the processing and transmitting method of the second payload data B1 comprises any one or more out of:
decoding encoded second payload data B1 and L2-forwarding; and L1-forwarding.

In some embodiments the second payload data B1 comprises the third payload data B2 intended for the third wireless node 323, and the second indicator A2. The second indicator A2 indicates to the second wireless node 322 how to relay the third payload data B2 and comprises parameters related to radio transmission of the third payload data B2.

The receiving module 1910 may be implemented by a receiver or a processor 1980 in the relaying wireless node 312.

The relaying wireless node 312 is further configured to, e.g. by means of the relaying module 1820 configured to, relay the second payload data B1 based on the indicator A1.

In some embodiments the indicator A1 comprises an indication of the multi-hop path 331 to the second wireless node 322. Then the relaying wireless node 312 is further configured to relay the second payload data B1 through the multi-hop path 331 to the second wireless node 322.

In some embodiments the relaying wireless node 312 is configured to relay the second payload data B1 by being configured to transmit the second payload data B1.

In some embodiments the second payload data B1 and the indicator A1 are encoded separately. Then the relaying wireless node 312 may be configured to relay the second payload data B1 by being configured to process the encoded second payload data B1 and transmit the encoded second payload data B1.

In some other embodiments, the relaying wireless node 312 is configured to relay the second payload data B1 by being configured to process decoded second payload data B1 and transmit processed second payload data B1.

The relaying module 1920 may be implemented by the processor 1980 in the relaying wireless node 312.

In some embodiments wherein the second payload data B1 and the indicator A1 are encoded separately the relaying wireless node 312 is further configured to, e.g. by means of the decoding module 1930 configured to, decode the indicator A1 separately from the second payload data B1.

The decoding module 1930 may be implemented by the processor 1980 in the relaying wireless node 312.

The relaying wireless node 312 may further be configured to, e.g. by means of the adding module 1930 configured to, add the indication of the multi-hop path 332 to the first wireless node 311 to the second payload data B1.

The adding module 1930 may be implemented by the processor 1980 in the relaying wireless node 312.

The embodiments herein for relaying data from the first wireless node 311 and intended for reception by the second wireless node 322 may be implemented through one or more processors, such as the processor 1980 in the relaying wireless node 312 depicted in FIG. 19 together with computer program code for performing the functions and actions of the embodiments herein. The program code mentioned above may also be provided as a computer program product 1991 for instance in the form of a data carrier carrying computer program code 1992 for performing the embodiments herein when being loaded into the relaying wireless node 312. One such carrier may be in the form of a CD ROM disc. It is however feasible with other data carriers such as a memory stick. The computer program code may furthermore be provided as pure program code on a server and downloaded to.

Thus, the methods according to the embodiments described herein for the relaying wireless node 312 may be implemented by means of a computer program product, comprising instructions, i.e., software code portions, which, when executed on at least one processor, cause the at least one processor to carry out the actions described herein, as performed by the relaying wireless node 312. The computer program product may be stored on a computer-readable storage medium. The computer-readable storage medium, having stored there on the computer program, may comprise the instructions which, when executed on at least one processor, cause the at least one processor to carry out the actions described herein, as performed by the relaying wireless node 312. In some embodiments, the computer-readable storage medium may be a non-transitory computer-readable storage medium.

Those skilled in the art will also appreciate that the receiving module 1910, the relaying module 1920 and the decoding module 1930 and the adding module 1940 described above may refer to a combination of analogue and digital circuits, and/or one or more processors configured with software and/or firmware, e.g. stored in a memory 1990 that when executed by the one or more processors such as the processor 1980 perform as described above. One or more of these processors, as well as the other digital hardware, may be included in a single ASIC, or several processors and various digital hardware may be distributed among several separate components, whether individually packaged or assembled into a SoC.

The relaying wireless node 312 may further be configured to, e.g. by means of the memory 1990 configured to, store for example, the payloads, the indicators, such as MAC elements and/or MAC headers, indications of multi-hop paths, identities of relaying wireless nodes and configuration, transmission formats for the second payload data B1, radio resource allocations to use for relaying the second payload data B1, processing and transmitting methods of the second payload data B1, Demodulation reference signal assignments, number of layers to use when transmitting the second payload data B1, instructions relating to how to derive pre-coding for transmission of the second payload data B1, prioritization information for scheduling of the second payload data B1, schedulings and applications etc. to perform the methods herein when being executed in the relaying wireless node 312. The memory 1990 comprises one or more memory units.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure. Embodiments herein may be enabled as a 5G function but may also be added to legacy standards such as LTE or WiFi.

A channel coding of the MAC header and the remapping of the data in the forward data transmission may be different depending on the radio standard.

Also note that terminology such as a wireless node and a second wireless node should be considered to be non-limiting and does in particular not imply a certain hierarchical relation between the two.

The invention claimed is:

1. A method performed by a first wireless node for enabling relaying by a relaying wireless node of data intended for reception by a second wireless node, which first wireless node, second wireless node and relaying wireless node each operate in a wireless communications network, the method comprising:
generating first payload data comprising second payload data and which first payload data further comprising an indicator that is configured to indicate to the relaying wireless node how to relay the second payload data toward the second wireless node, and wherein the indicator is further configured to comprise parameters related to radio transmission of the second payload data, the parameters including demodulation reference signal assignments that are to be used by the second wireless node to decode the second payload data; and
transmitting the first payload data to the relaying wireless node.

2. A first wireless node for enabling relaying by a relaying wireless node of data intended for reception by a second wireless node, which first wireless node, second wireless node and relaying wireless node each are configured to operate in a wireless communications network, the first wireless node comprising:
a processor; and
a memory coupled to the processor and storing program code that is executed by the processor to perform operations comprising:
generating a first payload data comprising a second payload data intended for the second wireless node and which first payload data further comprising an indicator that indicates to the relaying wireless node how to relay the second payload data, and which indicator comprises parameters related to radio transmission of the second payload data, the parameters including a demodulation reference signal assignment enabling the second wireless node to decode the second payload data; and
transmitting the first payload data to the relaying wireless node.

3. The first wireless node according to claim 2, wherein the indicator is comprised in a Medium Access Control, MAC, element.

4. The first wireless node according to claim 2, wherein the operations further comprise encoding the indicator separately from the second payload data.

5. The first wireless node according to claim 2, wherein the second payload data comprises a third payload data intended for a third wireless node, and a second indicator which indicates to the second wireless node how to relay the third payload data, and which second indicator comprises second parameters related to radio transmission of the third payload data, the second parameters including a second demodulation reference signal assignment enabling the third wireless node to decode the third payload data.

6. The first wireless node according to claim 2, further configured to:
receive a payload data originating from the second wireless node and comprising an indication of a multi-hop path to the second wireless node, and
transmit the first payload data comprising the second payload data intended for the second wireless node to the relaying wireless node and further through the multi-hop path based on the indication of the multi-hop path to the second wireless node, wherein the indicator is based on the indication of the multi-hop path.

7. The first wireless node according to claim 2, wherein the indicator comprises any one or more out of:
   a transmission format for the second payload data;
   a radio resource allocation to use for relaying the second payload data;
   a processing and transmitting method of the second payload data;
   number of layers to use when transmitting the second payload data;
   instructions relating to how to derive pre-coding for transmission of the second payload data;
   prioritization information for scheduling of the second payload data; and
   one or more identities of relaying wireless nodes.

8. The first wireless node according to claim 7, wherein the generating and the transmitting of the second payload data comprised in the first payload data comprises any one or more out of:
   decoding encoded second payload data and L2-forwarding; and
   L1-forwarding.

9. A method performed by a relaying wireless node for relaying data from a first wireless node and intended for reception by a second wireless node, which first wireless node, second wireless node and relaying wireless node each operate in a wireless communications network, the method comprising:
   receiving a first payload data from the first wireless node, which first payload data comprises a second payload data intended for the second wireless node, and which first payload data further comprises an indicator, which indicator indicates to the relaying wireless node how to relay the second payload data, and which indicator comprises parameters related to radio transmission of the second payload data, the parameters including a demodulation reference signal assignment enabling the second wireless node to decode the second payload data; and
   relaying the second payload data in accordance with the indicator.

10. A relaying wireless node for relaying data from a first wireless node and intended for reception by a second wireless node, which first wireless node, second wireless node and relaying wireless node each are configured to operate in a wireless communications network, the relaying wireless node comprising:
   a processor; and
   a memory coupled to the processor and storing program code that is executed by the processor to perform operations comprising:
      receiving a first payload data from the first wireless node, which first payload data comprises a second payload data intended for the second wireless node, and which first payload data further comprises an indicator, which indicator indicates to the relaying wireless node how to relay the second payload data, and which indicator comprises parameters related to radio transmission of the second payload data, the parameters including a demodulation reference signal assignment enabling the second wireless node to decode the second payload data; and
      relaying the second payload data toward the second wireless node in accordance with the indicator.

11. The relaying wireless node according to claim 10, wherein the indicator is comprised in a Medium Access Control, MAC, element.

12. The relaying wireless node according to claim 10, wherein the second payload data and the indicator are encoded, and wherein the relaying wireless node is further configured to decode the indicator separately from the second payload data.

13. The relaying wireless node according to claim 10, wherein the second payload data comprises a second indicator and a third payload data intended for a third wireless node, and a second indicator comprising instructions to the second wireless node how to relay the third payload data.

14. The relaying wireless node according to claim 10, wherein the operations further comprise adding an indication of a multi-hop path to the first wireless node to the second payload data.

15. The relaying wireless node according to claim 10, wherein the indicator comprises an indication of a multi-hop path to the second wireless node, and wherein the operations further comprise relaying the second payload data through the multi-hop path to the second wireless node.

16. The relaying wireless node according to claim 10, wherein the relaying wireless node is configured to relay the second payload data by being configured to transmit the second payload data.

17. The relaying wireless node according to claim 10, wherein the second payload data is encoded to form an encoded second payload data and wherein the relaying wireless node is configured to relay the second payload data by being configured to process the encoded second payload data and transmit the encoded second payload data.

18. The relaying wireless node according to claim 12, wherein the relaying wireless node is configured to relay the second payload data by being configured to process decoded second payload data and transmit processed second payload data.

19. The relaying wireless node according to claim 10, wherein the indicator comprises any one or more out of:
   a transmission format for the second payload data;
   a radio resource allocation to use for relaying the second payload data;
   a processing and transmitting method of the second payload data;
   number of layers to use when transmitting the second payload data;
   instructions relating to how to derive pre-coding for transmission of the second payload data;
   prioritization information for scheduling of the second payload data; and
   one or more identities of relaying wireless nodes.

20. The relaying wireless node according to claim 19, wherein the processing and transmitting method of the second payload data comprises any one or more out of:
   decoding encoded second payload data and L2-forwarding; and
   L1-forwarding.

* * * * *